(12) United States Patent
Equall et al.

(10) Patent No.: US 7,839,904 B1
(45) Date of Patent: Nov. 23, 2010

(54) MONOBLOCK LASER SYSTEMS AND METHODS

(75) Inventors: Randy W. Equall, Bozeman, MT (US); Steven C. Seitel, Bozeman, MT (US)

(73) Assignee: Scientific Materials Corporation, Bozeman, MT (US)

( * ) Notice: Subject to any disclaimer, the term of this patent is extended or adjusted under 35 U.S.C. 154(b) by 0 days.

(21) Appl. No.: 11/513,637

(22) Filed: Aug. 31, 2006

Related U.S. Application Data

(63) Continuation-in-part of application No. 11/340,305, filed on Jan. 26, 2006, and a continuation-in-part of application No. 11/371,457, filed on Mar. 9, 2006.

(51) Int. Cl.
*H01S 3/11* (2006.01)
*H01S 3/10* (2006.01)
*H01S 3/086* (2006.01)
*H01S 3/108* (2006.01)

(52) U.S. Cl. .................. 372/10; 372/11; 372/27; 372/69; 372/70; 372/99; 372/106; 372/107; 372/21

(58) Field of Classification Search .......... 372/10, 372/11, 70, 21, 27, 69, 99, 106, 107
See application file for complete search history.

(56) References Cited

U.S. PATENT DOCUMENTS

| | | | | |
|---|---|---|---|---|
| 4,030,046 A | * | 6/1977 | Firester | 372/65 |
| 3,641,458 A | | 2/1982 | La Tourrette et al. | |
| 4,420,836 A | * | 12/1983 | Harper | 372/98 |
| 4,731,795 A | | 3/1988 | Clark et al. | |
| 5,181,211 A | | 1/1993 | Burnham et al. | |
| 5,249,195 A | | 9/1993 | Feldman et al. | |
| 5,260,954 A | * | 11/1993 | Dane et al. | 372/25 |
| 5,265,113 A | * | 11/1993 | Halldorsson et al. | 372/36 |
| 5,414,724 A | * | 5/1995 | Zhou et al. | 372/10 |
| 5,436,920 A | | 7/1995 | Minemoto et al. | |
| 5,596,404 A | * | 1/1997 | Beck et al. | 356/301 |
| 5,608,744 A | | 3/1997 | Hovis et al. | |
| 5,675,594 A | | 10/1997 | Hovis et al. | |

(Continued)

FOREIGN PATENT DOCUMENTS

JP 2006073962 * 3/2006

OTHER PUBLICATIONS

Zheng et al. "LD-pumped single frequency passively Q-switched green laser," Optics & Laser Technology, 34, (2002) 425-427.*

(Continued)

*Primary Examiner*—Minsun Harvey
*Assistant Examiner*—Michael Carter
(74) *Attorney, Agent, or Firm*—Haynes and Boone, LLP

(57) ABSTRACT

Systems and methods are disclosed herein to provide monoblock lasers that may provide improved performance and/or reduce manufacturing costs. For example, in accordance with an embodiment of the present invention, a monoblock laser includes a gain block to generate the light at the first wavelength and a Q switch to receive and polarize the light from the gain block and provide pulsed light that is polarized and at the first wavelength, with the monoblock laser configured in an internal OPO configuration. The monoblock laser may include a film between the gain block and a common substrate and/or include various techniques for aligning various optical elements within the monoblock laser.

35 Claims, 11 Drawing Sheets

U.S. PATENT DOCUMENTS

| | | | |
|---|---|---|---|
| 5,679,964 | A | 10/1997 | Kobayashi et al. |
| 5,754,333 | A | 5/1998 | Fulbert et al. |
| 5,841,798 | A | 11/1998 | Chen et al. |
| 5,953,362 | A | 9/1999 | Pamulapati et al. |
| 6,031,853 | A | 2/2000 | Greene et al. |
| 6,170,795 | B1 | 1/2001 | Wayne |
| 6,212,212 | B1 | 4/2001 | Honmou |
| 6,317,278 | B1 | 11/2001 | Metsala |
| 6,373,865 | B1 | 4/2002 | Nettleton et al. |
| 6,377,593 | B1 | 4/2002 | Peterson et al. |
| 6,501,772 | B1 | 12/2002 | Peterson |
| 6,536,736 | B2 | 3/2003 | Wayne et al. |
| 6,556,614 | B2 | 4/2003 | Nettleton et al. |
| 6,566,614 | B1 | 5/2003 | Fluckiger et al. |
| 6,570,895 | B2 | 5/2003 | Heberle |
| 6,669,367 | B2 | 12/2003 | Lin et al. |
| 6,710,914 | B2 | 3/2004 | Arbore et al. |
| 6,735,234 | B1 | 5/2004 | Paschotta et al. |
| 6,754,418 | B1 | 6/2004 | Holm et al. |
| 6,774,801 | B2 | 8/2004 | Phillips et al. |
| 6,778,581 | B1 | 8/2004 | Lipson |
| 6,826,329 | B2 | 11/2004 | Imada |
| 6,839,493 | B2 | 1/2005 | Berto |
| 6,900,472 | B2 | 5/2005 | Kondoh et al. |
| 2002/0110159 | A1* | 8/2002 | Gerstenberger et al. ....... 372/22 |
| 2003/0138012 | A1 | 7/2003 | Wang et al. |
| 2004/0066805 | A1 | 4/2004 | Afzal et al. |
| 2004/0218652 | A1 | 11/2004 | Spariosu et al. |
| 2004/0233961 | A1* | 11/2004 | Lutgen ........................ 372/70 |
| 2005/0249464 | A1* | 11/2005 | Case et al. .................... 385/52 |
| 2006/0092991 | A1 | 5/2006 | Nettleton |
| 2006/0092992 | A1 | 5/2006 | Nettleton |
| 2006/0280221 | A1 | 12/2006 | Seitel |

OTHER PUBLICATIONS

Taira et al., Passively Q-switched Nd: YAG microchip laser over 1-MW peak output power for micro drilling, 2006 Optical Society of America, 2 pages.

Mayorga-Cruz et al., Kinetics of a solid-state laser with polarizable saturable absorber, Optics Express, vol. 9, No. 9, Oct. 22, 2001, 8 pages.

J. Nettleton et al, "Monoblock laser for a low-cost, eyesafe, microlaser range finder", Applied Optics, vol. 39, No. 15, May 20, 2000, pp. 2428-2432.

F. Jenkins et al., Fundamentals of Optics, 3rd ED., 1957, pp. 24-25.

* cited by examiner

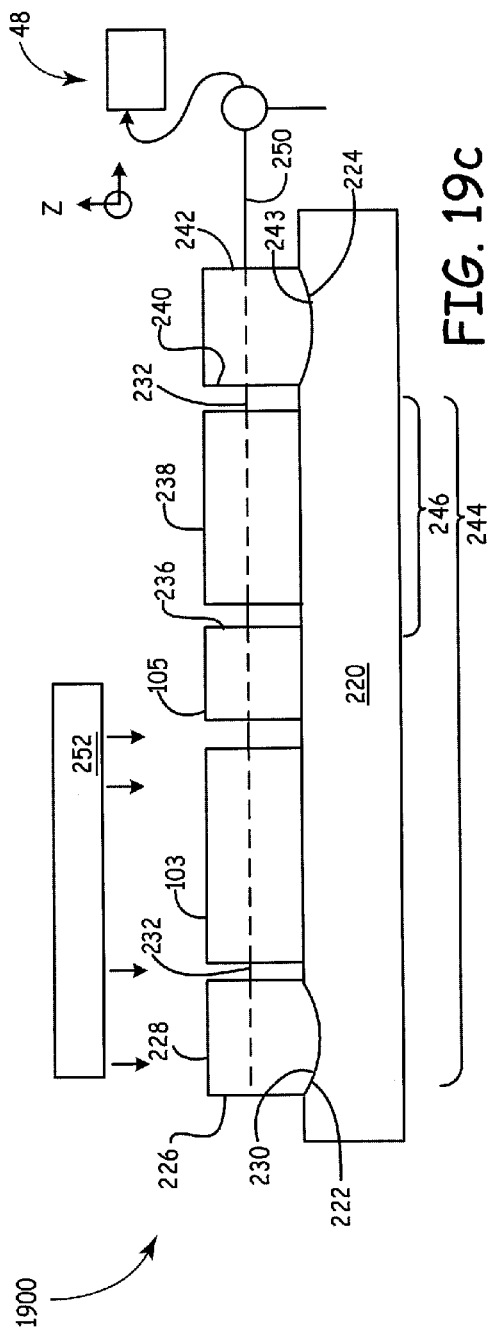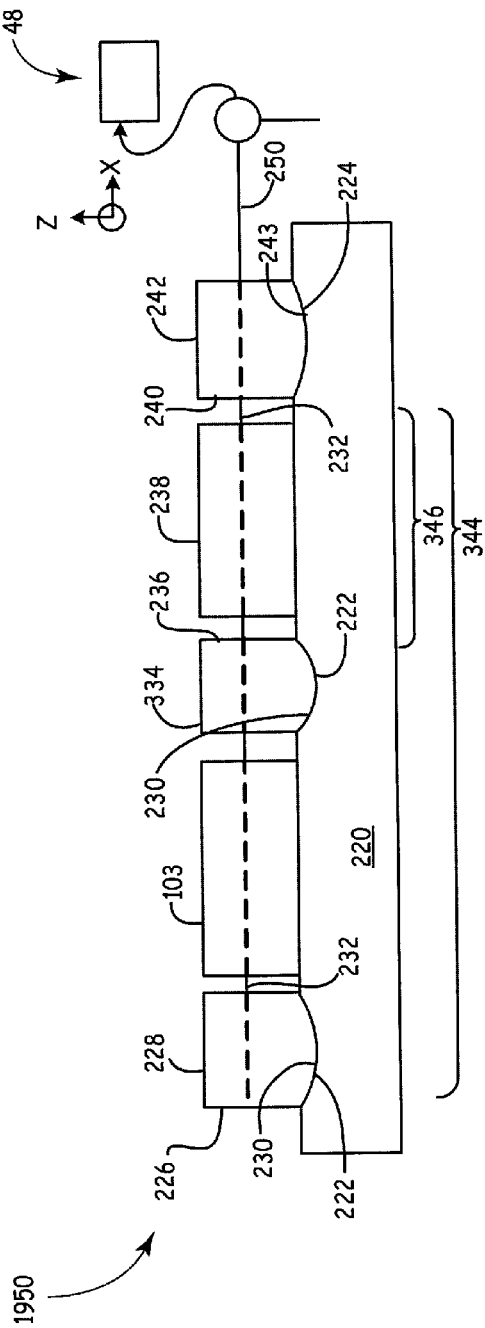

MONOBLOCK LASER SYSTEMS AND METHODS

CROSS-REFERENCE TO RELATED APPLICATIONS

This patent application is a continuation-in-part of U.S. patent application Ser. No. 11/340,305, entitled "Monoblock Laser with Reflective Substrate" and filed Jan. 26, 2006, and is also a continuation-in-part of U.S. patent application Ser. No. 11/371,457, entitled "Monoblock Laser with Improved Alignment Features" and filed Mar. 9, 2006, which are both incorporated herein by reference in their entirety.

TECHNICAL FIELD

The present invention relates generally to lasers and, more particularly, to monoblock lasers.

BACKGROUND

Monoblock lasers, which typically include a number of optical elements assembled on a common substrate to provide a compact, single-piece laser, are used in a variety of applications. For example, monoblock lasers are typically used in laser rangefinders and targeting systems and have proven to be rugged, thermally reliable, and cost effective to produce.

A conventional monoblock laser (e.g., eye-safe, monoblock laser resonators) may include a Nd:YAG gain block, a $Cr^{4+}$:YAG passive Q-switch, and a KTP nonlinear frequency-conversion crystal (e.g., all of square cross-section), which are permanently bonded (along with other optical components as required by the desired application) in precise, optical alignment to an undoped YAG rail or other type of common substrate to provide a stable, unified structure. The KTP crystal requires linearly polarized laser radiation for frequency-conversion and therefore some method for polarizing the resonant radiation must be provided.

The conventional approach for achieving polarization is by providing the Nd:YAG gain block with an internal Brewster interface, but this approach has a number of disadvantages. For example, the Nd:YAG gain block must be fabricated as two separate sub-blocks having precisely matched, Brewster-angled optical faces, which requires special fixtures and additional processing time to manufacture this Brewster pair to the required optical tolerances. The resulting Brewster pair is substantially longer than otherwise necessary for efficient laser operation and the assembled interface is difficult (or impossible) to clean when necessary. Furthermore, the Brewster "toes" are very fragile and breakage contributes to reduced yield at all stages of manufacture and the Brewster interface may contribute to additional resonator loss and beam quality degradation. Thus, substantial savings in time and cost may result along with potentially increased performance if the Brewster interface can be eliminated.

Other conventional polarization methods, as an alternative to the Brewster interface within the Nd:YAG gain block, may include cube polarizers (e.g., too expensive), thin parallel plates oriented at the Brewster's angle (e.g., too fragile), or a self-polarizing laser medium such as $Nd:YVO_4$ (e.g., less reliable than Nd:YAG). However as indicated, these approaches also have certain undesirable limitations. As a result, there is a need for improved monoblock laser techniques that, for example, may improve performance and may provide an inexpensive and reliable alternative to the Brewster interface without adding unnecessary complexity.

SUMMARY

Systems and methods are disclosed herein to provide monoblock lasers that may provide improved performance and/or improved manufacturability. For example, in accordance with an embodiment of the present invention, a monoblock laser is provided that includes a Q switch that is oriented and implemented to also provide a polarizing function, which allows the Brewster interface to be eliminated from the gain medium. Consequently, a monoblock laser resonator may be manufactured with certain cost reduction improvements relative to conventional monoblock lasers. The monoblock laser may further include, for example, a film between the gain medium and the common substrate, which may provide improved performance and/or reduced power requirements. The monoblock laser may further include various techniques for adjusting/aligning one or more of the optical components and may further include one or more Risley wedge pairs.

More specifically in accordance with one embodiment of the present invention, a monoblock laser includes a substrate; a reflective mirror, disposed on the substrate, adapted to reflect light of a first wavelength; a gain block, disposed on the substrate, adapted to generate the light at the first wavelength and receive the light reflected from the reflective mirror; a Q switch, disposed on the substrate, adapted to receive and polarize the light from the gain block and provide pulsed light that is polarized and at the first wavelength; a dichroic mirror, disposed on the substrate, adapted to pass the pulsed light from the Q switch and reflect light at a second wavelength; an optical parametric oscillator crystal, disposed on the substrate, adapted to receive the pulsed light from the dichroic mirror and convert at least a portion of the pulsed light at the first wavelength into light at the second wavelength; and an output coupler mirror, disposed on the substrate, adapted to reflect light at the first wavelength and pass at least a portion of the light at the second wavelength to provide a laser output signal, wherein the reflective mirror and the output coupler mirror form a first resonant cavity, and the dichroic mirror and the output coupler mirror form a second resonant cavity within the first resonant cavity.

In accordance with another embodiment of the present invention, a monoblock laser includes a common substrate; a first reflective means, coupled to the common substrate, for reflecting light at a first wavelength; means for generating light at the first wavelength, wherein the first reflective means reflects the light at the first wavelength towards the generating means, and wherein the generating means is coupled to the common substrate; a film disposed at least partially between the common substrate and the generating means to reflect optical pumping light into the generating means; a switching means, coupled to the common substrate, for receiving and polarizing the light from the generating means and providing pulsed light that is polarized and at the first wavelength; a first mirror means, coupled to the common substrate, for passing the pulsed light from the switching means and for reflecting light at a second wavelength; means for converting the pulsed light at the first wavelength into light at the second wavelength, wherein the converting means is coupled to the common substrate; and a first coupling means, coupled to the common substrate, for reflecting light at the first wavelength and for passing at least a portion of the light at the second wavelength to provide an output signal for the monoblock laser.

In accordance with another embodiment of the present invention, a method of providing light from a monoblock laser includes generating light at a first wavelength; polarizing the light with a Q switch to provide polarized light at the first wavelength; passing light at the first wavelength and reflecting light at a second wavelength; converting the light at the first wavelength into light at the second wavelength; and transmitting at least a portion of the light at the second wavelength as an output signal of the monoblock laser and reflecting light at the first wavelength back into the monoblock laser, wherein the monoblock laser is configured in an internal optical parametric oscillator configuration.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 19c and 19d show exemplary monoblock lasers implementations using the matching spherical radii shown in FIGS. 19a and/or 19b in accordance with one or more embodiments of the present invention.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
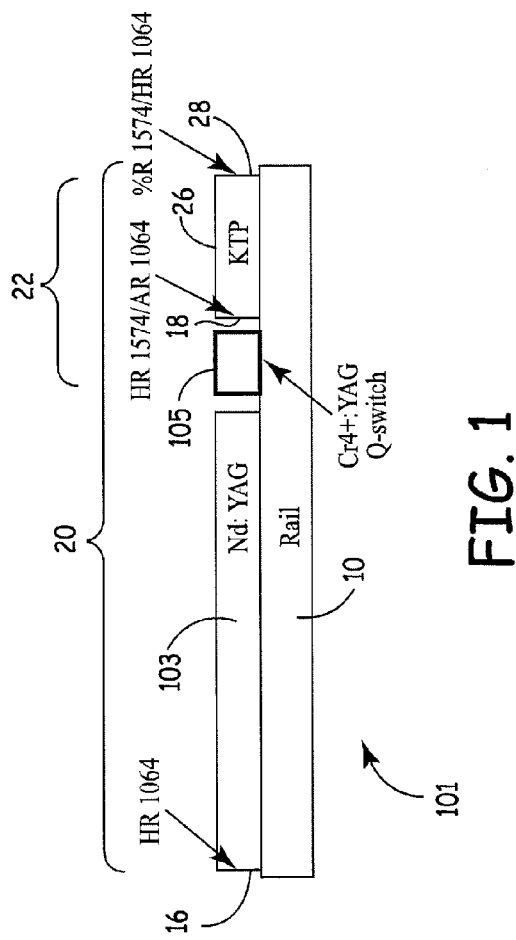
FIG. 1 shows a block diagram illustrating an exemplary monoblock laser in accordance with an embodiment of the present invention.

FIG. 1 shows a block diagram illustrating generally an exemplary monoblock laser 101 in accordance with an embodiment of the present invention. Monoblock laser 101 includes a gain block 103 (e.g., a Nd:YAG gain block), a Q switch 105 (e.g., a $Cr^{4+}$:YAG Q-switch crystal), and an optical parametric oscillator (OPO) crystal 26 (e.g., a KTP nonlinear frequency-conversion crystal) on a substrate 10 (e.g., an undoped YAG rail). A highly reflective (HR) mirror 16 may be disposed at one end of gain block 103, an output coupler (OC) mirror 28 may be disposed at an end of OPO crystal 26, and a dichroic (HR/HT) mirror 18 may be disposed between HR mirror 16 and OC mirror 28 (e.g., between Q switch 105 and OPO crystal 26 as shown).

For example as an exemplary implementation, OC mirror 28 (e.g., 60% R 1574/HR 1064 deposited on the end of OPO crystal 26) may pass a portion of light at a wavelength of 1574 nm (i.e., 1.574 µm or approximately 1.57 µm) as a final output of monoblock laser 101, while reflecting light at a wavelength of 1064 nm (i.e., 1.064 µm or approximately 1.06 µm) back into OPO crystal 26 (e.g., a KTP crystal). Dichroic mirror 18 (e.g., HR 1574/AR 1064 deposited on OPO crystal 26 or Q switch 105) allows through light at a wavelength of 1064 nm, while reflecting light at a wavelength of 1574 nm back into OPO crystal 26. HR mirror 16 (e.g., HR 1064 deposited on the end of gain block 103) reflects light at a wavelength of 1064 nm back into gain block 103, which generates light at a wavelength of 1064 nm when provided with an appropriate optical pumping light source, as would be understood by one skilled in the art.

Monoblock laser 101 is configured in this exemplary embodiment in an internal OPO configuration (intracavity OPO sub-resonator), with a first resonant cavity 20 formed between HR mirror 16 and OC mirror 28 and a second resonant cavity 22 formed within first resonant cavity 20 between dichroic mirror 18 and OC mirror 28. A conventional monoblock laser approach for monoblock laser 101 would generally require some type of polarization method, such as by providing gain block 103 with an internal Brewster interface or by providing an additional optical element (e.g., a cube polarizer), with their drawbacks as previously noted.

In contrast in accordance with one or more embodiments of the present invention, monoblock laser 101 uses passive Q switch 105, properly cut and oriented as discussed further herein, to function as a polarizer as well. Consequently for example, the difficult-to-fabricate and thus expensive Brewster pair found in a conventional eye-safe monoblock laser may be replaced with a simpler, single rectangular gain block (e.g., gain block 103), with Q switch 105 implemented to provide the polarization function formerly provided by the inclined end faces of the Brewster pair of the conventional gain block.

A monoblock laser (e.g., a monoblock laser resonator) in accordance with an embodiment of the present invention may provide equivalent performance to a conventional monoblock laser and may be less expensive to manufacture. For example, by eliminating the Brewster pair (which may be difficult and time-consuming to manufacture, fragile and subject to breakage during assembly, difficult to clean when assembled, and often longer than necessary for optimal coupling to an appropriate optical pumping light source, such as a flash lamp), significant cost savings may be achieved, a shorter gain block may be implemented (e.g., for optimal coupling to the optical pumping light source), and optical elements may be spaced more appropriately (e.g., for improved divergence). For example, a shorter gain block provides additional space on the rail (e.g., substrate 10) to stretch the OPO sub-resonator (e.g., within second resonant cavity 22) to reduce divergence within a given envelope (e.g., for a given monoblock laser size).

In general for a conventional eye-safe monoblock laser, the polarizing effect of the Brewster interface is not dependent on the intensity of the circulating pump radiation and the loss ratio between polarization components is fixed. One polarization always sees a higher loss than the other and will always lose out in the competition for the available gain. This guarantees that the pump radiation will have sufficient polarization purity for nonlinear frequency conversion.

In contrast for a monoblock laser with Q switch 105 providing a polarizing function, the polarization selection depends strongly on the intensity of the circulating pump radiation. The loss anisotropy increases as the pump radiation intensity increases and, in the absence of any other intensity-dependent resonator losses, the "preferred" polarization will again win the gain competition.

However such as for monoblock laser 101 with the exemplary implementation of the OPO sub-resonator inside the pump resonator (internal OPO configuration), the OPO sub-resonator presents an additional intensity-dependent loss to the pump radiation as the OPO operates on only the "preferred" component of the circulating pump radiation and converts much of it to the desired eye-safe light. Consequently, this process removes some of the "preferred" pump radiation, reducing the loss anisotropy, and indicates that it may not be feasible to implement an eye-safe monoblock laser in the internal OPO configuration for wavelength conversion with Q switch 105 providing a polarizing function.

Figure 2:
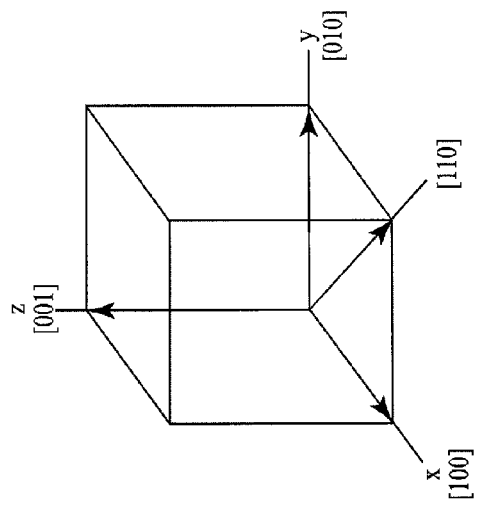
FIG. 2 shows a block diagram illustrating an exemplary cubic unit cell for discussion in accordance with an embodiment of the present invention.
Figure 3:
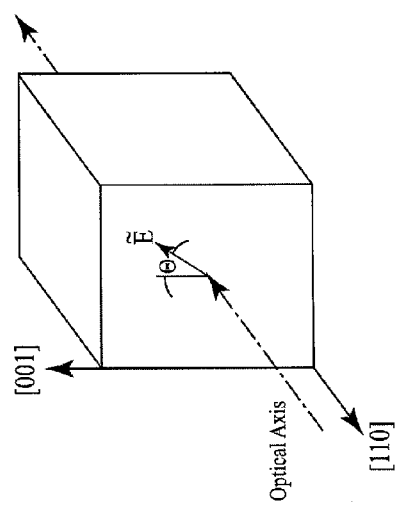
FIG. 3 shows a block diagram illustrating an exemplary polarizing Q-switch in accordance with an embodiment of the present invention.

As explained further herein, experiments were performed to determine the feasibility of a monoblock laser having the Q switch (e.g., Q switch 105) function as the linearly polarizing element for the internal OPO configuration in accordance with an embodiment of the present invention. For example, FIG. 2 shows a block diagram of a cubic unit cell and illustrates the cubic nature of an exemplary $Cr^{4+}$:YAG crystal structure and relevant crystallographic axes. To act as a polarizer, the Q-switch crystal must be "cut" so that the [110] crystal axis is parallel to the optical axis (i.e., so that laser radiation propagates parallel to the [110] crystal axis in the resonator, as illustrated in FIG. 3 (polarizing Q switch ([110] cut)) in accordance with an embodiment of the present invention. In this orientation, the saturated absorption loss of the Q-switch is anisotropic and specifically, it is minimum when the electric field vector $\tilde{E}$ of the circulating radiation is parallel to the body axis ($\Theta=0°$) and maximum when orthogonal to it ($\Theta=90°$). The parallel component of a circulating laser field will out-compete the orthogonal component for available laser gain, resulting in laser output which is largely polarized along the [001] axis.

Figure 4:
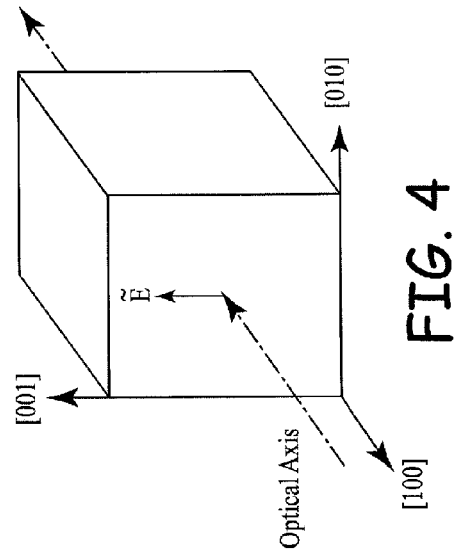
FIG. 4 shows a block diagram illustrating a conventional Q-switch.

For example, this approach is fundamentally different from the approach for a conventional Q switch illustrated in FIG. 4, which is cut so that laser radiation propagates directly down a body axis (i.e., [100]). All three body axes necessarily are mutually perpendicular, and therefore any beneficial saturated loss reduction obtained by aligning the electric vector, for example to [010], is exactly compensated by a corresponding misalignment to [001]. Consequently, there is no net polarization selection in the gain competition and a [100] cut Q-switch, for example, cannot be used as a polarizing element.

In general, only the saturated absorption loss (observed at high optical intensity) is anisotropic, while the unsaturated (low intensity) loss is not. The optical density (OD) of a Q switch refers to the unsaturated loss, which is the same for both Q switch cuts. Thus, the lasing threshold and output energy will be independent of Q switch orientation, while the polarization state of the output will not be independent.

The intensity-dependent transmission T of a "perfect" saturable absorber can be represented by equation (1), where $T_o$ represents the unsaturated transmission, which is related to the optical density by equation (2). $I_s$ represents a "saturation intensity" which determines the rate at which the absorption saturates. At low intensity, $I \gg I_s$, the transmission is approximately $T_o$, but for $I \gg I_s$, the transmission approaches unity (note that real Q switches are not "perfect" and exhibit excited state absorption and other fixed losses which limit saturated transmission to something less than unity).

$$T(I) = (I_s/I)\ln[1+T_o(e^{I/I_s}-1)] \quad (1)$$

$$OD = \log(1/T_o) \quad (2)$$

Figure 5:
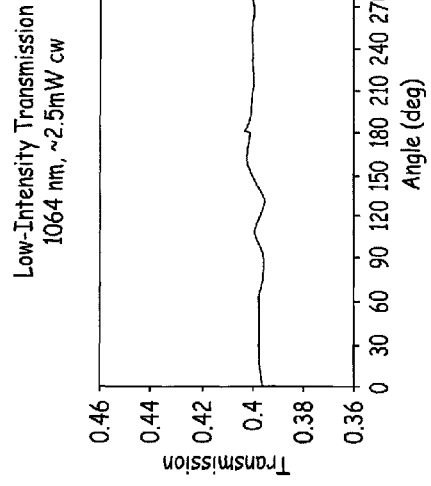
FIG. 5 shows a graph illustrating exemplary, idealized, passive Q-switch performance in accordance with an embodiment of the present invention.

FIG. 5 shows a graph of intensity-dependent transmission illustrating exemplary, idealized transition from unsaturated to saturated transmission for two values of $I_s$ which differ by approximately thirty percent in accordance with an embodiment of the present invention. Note as FIG. 5 is for illustrative purposes only, the intensity units are completely arbitrary, as is the choice of thirty percent anisotropy. The curve with lower saturation intensity ($I_s=14$) saturates sooner and thus presents less loss to the resonator during Q switch pulse buildup.

It can be inferred that the saturation intensity in $Cr^{4+}$:YAG must be minimum along the [001] body axis of a [110] cut "improved" Q-switch, because the laser output is observed to be polarized in that direction. For example as a test sample, a [110] cut $Cr^{4+}$:YAG Q switch was fabricated with an approximate optical density of 0.35 and an irregular cross section permitting a maximum clear aperture of 2.5 mm diameter. A reference flat ground on the "barrel" indicated the [110] direction. Additionally, an Nd:YAG gain block (25 mm long, 3.5 by 3.5 mm cross section, with flat end faces antireflection-coated at 1064 nm) was also fabricated by Scientific Materials Corporation, Inc. (located in Bozeman, Mont.). A 5 by 5 by 10 mm KTP crystal coated for monolithic OPO operation was also selected for use with the test sample.

Figure 6:
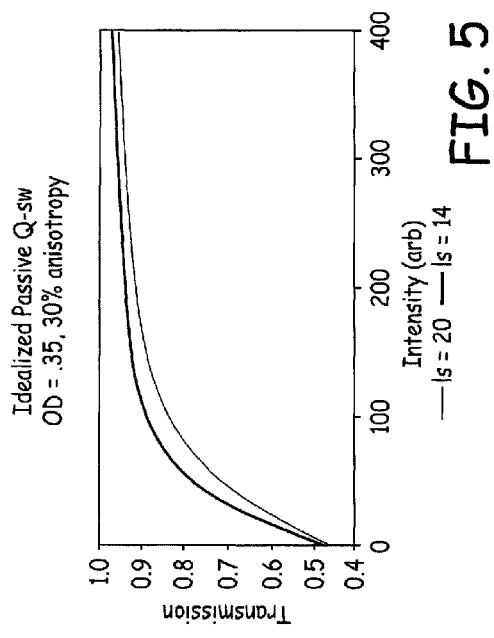
FIG. 6 shows an exemplary graph illustrating low-intensity transmission performance as a function of rotation for a Q-switch in accordance with an embodiment of the present invention.

Using the test sample (or test piece) and the selected components, the low intensity transmission limit $T_o$ was measured using approximately 3 mW of linearly polarized 1064 nm radiation from a continuous wave (CW) Nd:YVO$_4$ laser. The laser beam was collimated and expanded to overfill a 2 mm diameter aperture placed directly in front of the test piece, with FIG. 6 showing an exemplary graph illustrating measured transmission as a function of rotation about the optical axis and confirming that the unsaturated absorption is isotropic.

Figure 7:
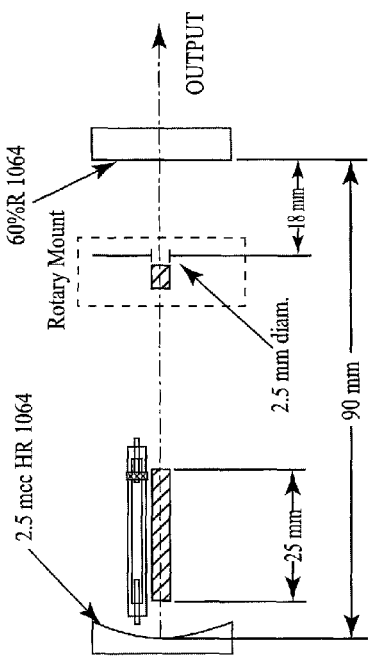
FIG. 7 shows a block diagram illustrating an exemplary test setup for a monoblock laser in accordance with an embodiment of the present invention.

To determine whether the test sample could simultaneously Q switch and polarize the laser output, a 1064-nm test resonator as shown in FIG. 7 was setup using a flexible laboratory breadboard, with Table 1 providing approximate exemplary optics cross-sections, test resonator parameters, and operating conditions. The Q switch and limiting aperture were installed as shown in a precision rotary mount so the [001] axis could be aligned to laboratory coordinates.

Figure 8:
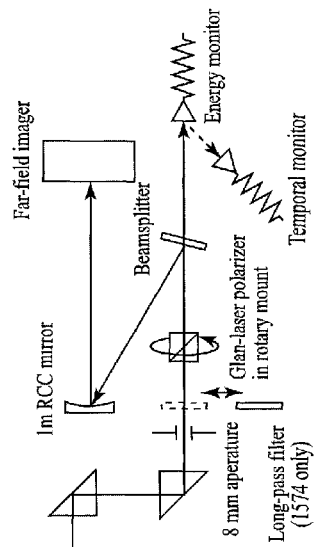
FIG. 8 shows a block diagram illustrating an exemplary test setup with external beam diagnostics for a monoblock laser in accordance with an embodiment of the present invention.

The test resonator Q switched satisfactorily, producing approximately 7 mJ of 1064 nm radiation in an 11 ns pulse. The far field spatial profile was clean and Gaussian-like, with divergence of approximately 4.6 by 4.3 mr (H×V). The degree and direction of output polarization was analyzed with a 10 mm Glan-laser polarizer and 8 mm diameter aperture, installed in the external beam diagnostics as illustrated in FIG. 8 (exemplary diagnostic beam-line setup) in accordance with an embodiment of the present invention.

TABLE 1

| Parameter | Value |
| --- | --- |
| Gain block cross-section | 3.5 × 3.5 mm |
| KTP cross-section | 5 × 5 mm |
| Limiting aperture (at Q switch) | 2.5 mm |
| Mirror Diameters | 25.4 mm |
| Flash lamp bore by arc length | 1.9 × 18 mm |
| Flash lamp discharge voltage | 275 V |
| Flash lamp pulse width | 120 μs |
| Pulse repetition frequency | 0.1 Hz |

Figure 9:
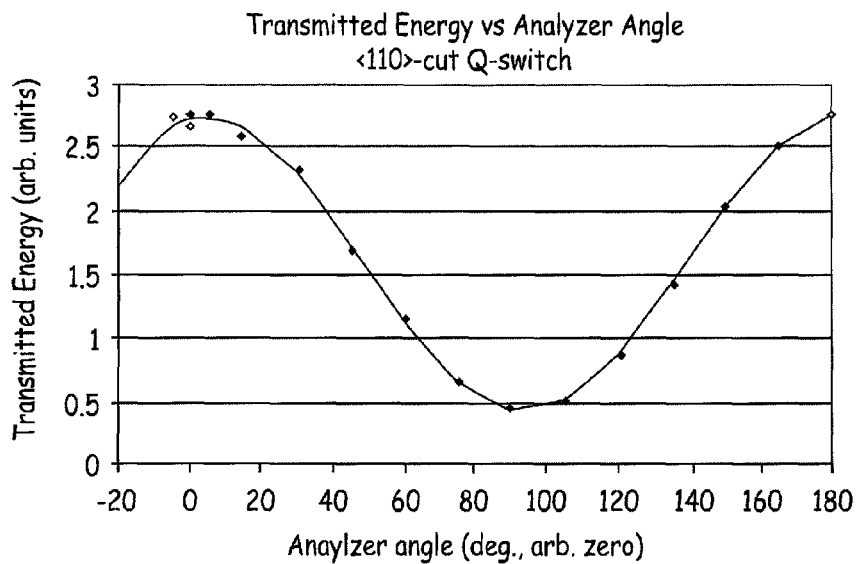
FIG. 9 shows an exemplary graph illustrating transmitted energy as a function of analyzer angle for a Q-switch in accordance with an embodiment of the present invention.

FIG. 9 shows an exemplary graph illustrating the energy transmitted by this polarizer for different rotation angles about the optical axis (e.g., 1064 nm polarization purity) in accordance with an embodiment of the present invention. The graph demonstrates that the output is preferentially polarized parallel to the [001] axis, with the polarization purity (ratio of parallel to orthogonal components) approximately 6:1 (e.g., the competition for available gain, while unequal, may not be completely one-sided). The polarization purity may depend upon the absolute magnitude of the available gain (which in turn depends upon the pumping rate and Q switch OD) and therefore, the ratio may be increased further by appropriate selection of parameters. Overall, the tests demonstrated that a [110] cut Q switch can provide a polarized output.

Additional tests (eye-safe laser tests) were performed to verify that the polarized output will drive the nonlinear conversion process with acceptable efficiency. The test resonator was modified by replacing its flat sixty percent output coupler with a "monolithic" OPO resonator, which included a KTP crystal cut for non-critical phase matching and coated as illustrated in the exemplary 1574 nm test resonator setup of FIG. 10 in accordance with an embodiment of the present invention.

Figure 10:
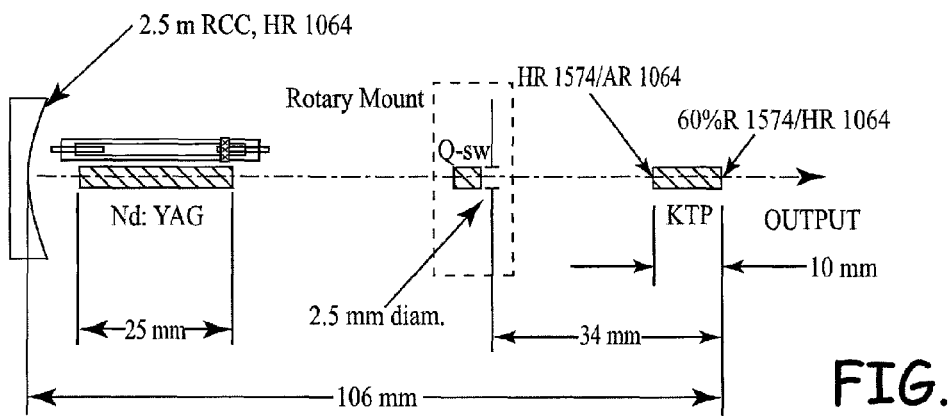
FIG. 10 shows a block diagram illustrating an exemplary test setup for a monoblock laser in accordance with an embodiment of the present invention.
Figure 11:
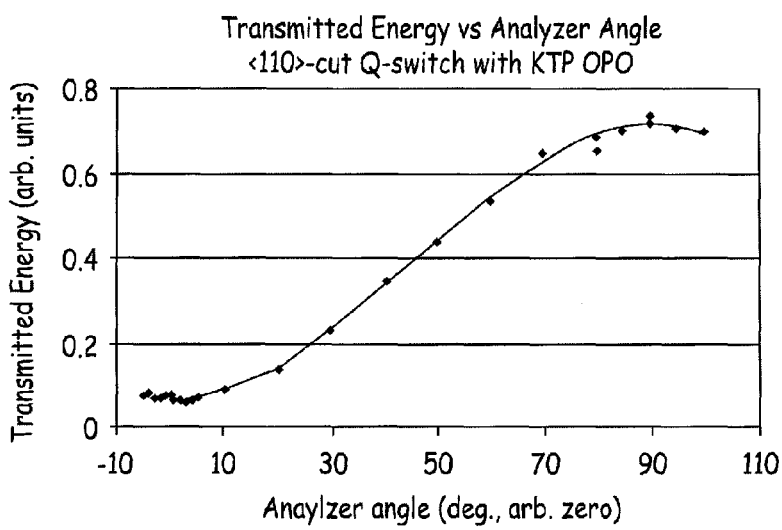
FIG. 11 shows an exemplary graph illustrating transmitted energy as a function of analyzer angle for a Q-switch in accordance with an embodiment of the present invention.

The test resonator shown in FIG. 10 readily-produced 1574 nm laser radiation with good efficiency and reproducibility and aligning the [001] axis of the Q switch parallel to the y-axis of the OPO produced the greatest energy at 1574 nm. The polarization purity at 1574 nm was approximately 9:1 as shown in the exemplary graph of FIG. 11 in accordance with an embodiment of the present invention. Overall, the results illustrate that a monoblock laser with [110] cut Q switch with a simple rectangular gain block (e.g., right-rectangular parallelepiped with square cross-section) will produce useable amounts of 1574 nm radiation.

Figure 12:
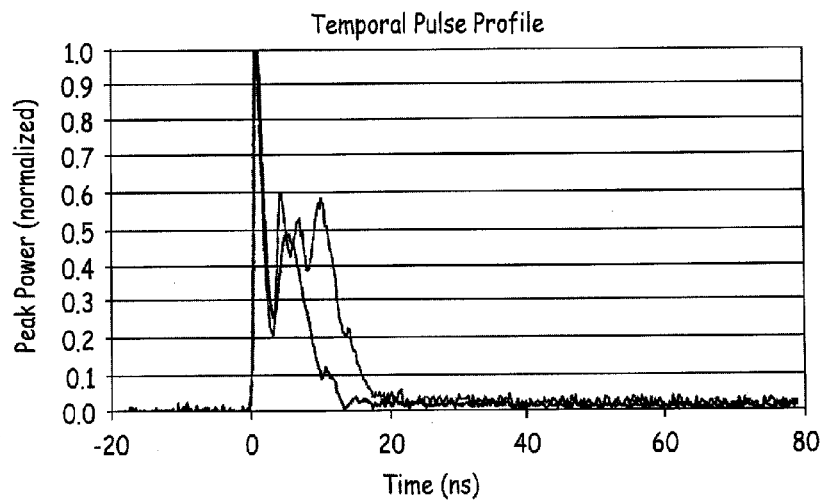
FIG. 12 shows an exemplary graph illustrating temporal pulse profiles for a Q-switch in accordance with an embodiment of the present invention.

In general, the test laser when started "cold" exhibited a "warm-up" variation similar to other flash-pumped, uncooled monoblock lasers. For example, FIG. 12 illustrates maximal pulse duration variations observed during warm-up for the test laser in accordance with an embodiment of the present invention. The initial spike shown in FIG. 12 is characteristic of all pulses examined, with the two pulses shown differing by less than three percent in output energy, but by a factor of approximately 1.5 in peak power.

Figure 13:
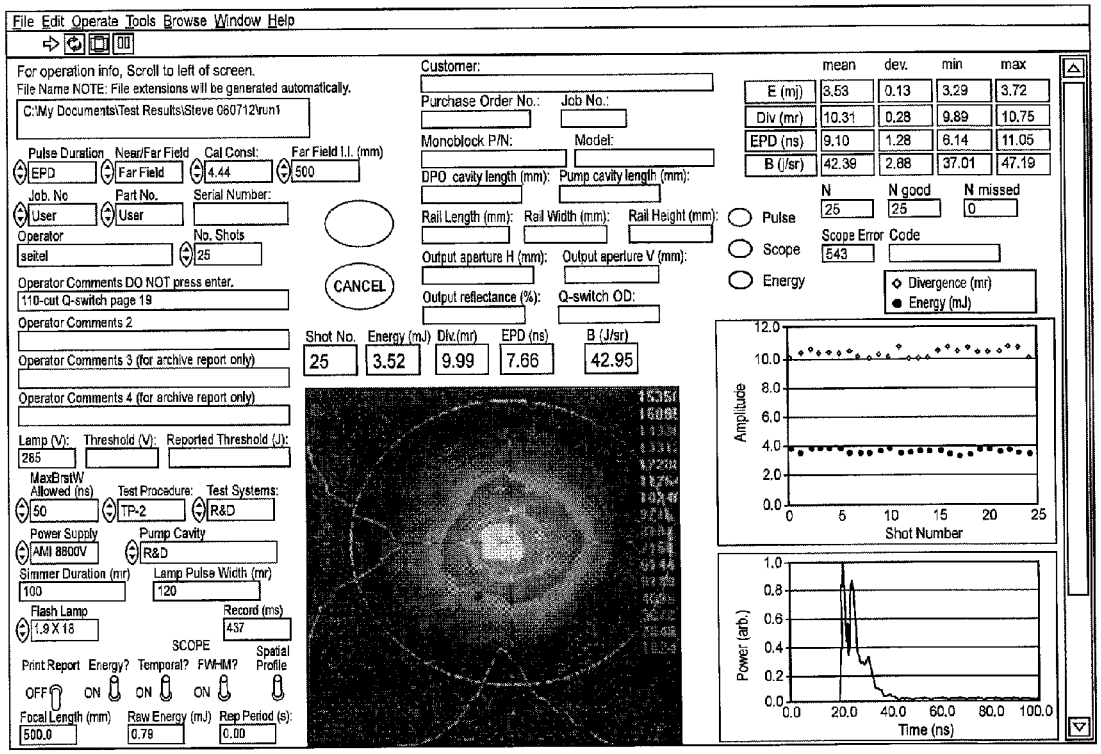
FIG. 13 shows an exemplary performance summary for a monoblock laser in accordance with an embodiment of the present invention.

For example, FIG. 13 shows typical performance for 25 consecutive shots, with the laser fully warmed up (e.g., exemplary performance summary for 1574 nm output) in accordance with an embodiment of the present invention. Output energy was approximately 3.5±0.1 mJ (in a 2.5 mm diameter aperture), the effective pulse duration was 9±1 ns, and the divergence was 10.3±0.3 mr, with these results representing typical spatial and temporal profiles for the tests.

The divergence and pulse duration are consistent relative to a conventional monoblock laser with a short (e.g., 10 mm) monolithic OPO. The energy may be lower due to the reduced limiting aperture, which if scaled to a 3 by 3 cross section, may result in the monoblock test resonator producing approximately 7 mJ (e.g., comparable to a 3 by 3 conventional monoblock laser). A very rough estimate of wavelength conversion efficiency E may be determined by recalling that the 1064 nm polarization purity was approximately 6:1 at 7 mJ output, while at 1574 nm the polarization purity was approximately 9:1 at 3.5 mJ. Thus, the conversion efficiency E may be calculated as set forth in equation (3).

$$E=[3.5*(90\%)]/[7*(86\%)]=52\% \quad (3)$$

The various tests and results (e.g., discussed in reference to FIGS. 5-13) illustrate in accordance with an embodiment of the present invention that the Q switch may be implemented to function also as a polarizer within the monoblock laser configuration. Consequently, the difficult-to-fabricate and thus expensive Brewster gain blocks may be substituted, for example, with a single, simpler rectangular gain block with normal end faces, which may provide certain benefits in terms of reduced manufacturing costs (e.g., in terms of materials, fabrication, assembly, and/or labor) and optical element spacing. For example, it may no longer be necessary to make the gain block medium 32 mm long overall (e.g., as typically required for Brewster pair fabrication) as the gain block for an exemplary embodiment of the present invention may be shortened for example to more closely match the 18 mm arc length of the flash lamp. Additionally, space would then be available on the 67 mm rail to stretch the OPO resonator cavity further, potentially reducing divergence and improving beam quality.

Figure 14:
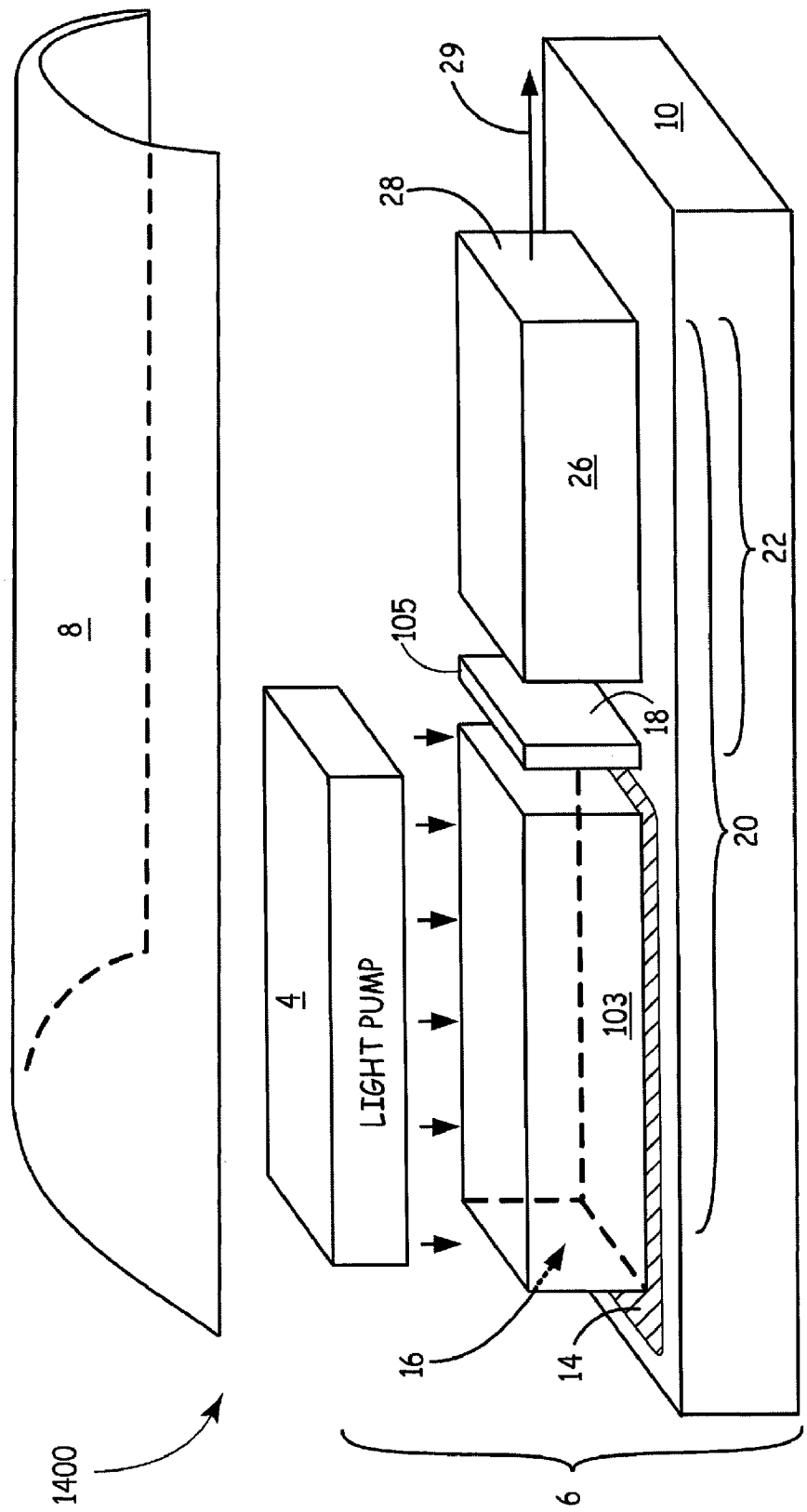
FIG. 14 shows a block diagram illustrating a perspective view of an exemplary monoblock laser having an internal OPO configuration in accordance with an embodiment of the present invention.

In accordance with one or more embodiments of the present invention, certain aspects of the present invention may be applied to a variety of monoblock laser applications and for a variety of monoblock laser implementations. For example, FIG. 14 shows a block diagram illustrating a perspective view of an exemplary implementation for a monoblock laser 1400 having an internal OPO configuration in accordance with an embodiment of the present invention.

Monoblock laser 1400 is similar to monoblock laser 101 (FIG. 1), but includes additional exemplary features as explained further herein in accordance with one or more embodiments of the present invention.

Monoblock laser 1400 includes a light source 4 (e.g., a light pump, such as one or more laser diodes or a flash lamp providing light at 720 to 840 nm wavelengths) coupling light into a resonator 6. A reflector 8 is disposed above and around resonator 6 to reflect light back into resonator 6 for higher efficiency operation. Reflector 8 may represent any type of reflector, with properties such as diffuse, specular, metallic, or non-metallic. Resonator 6 is supported by substrate 10, which provides support for the optical components in resonator 6 along an optical axis 29.

Substrate 10 may for example be a YAG rail, which provides a temperature coefficient that matches closely with a temperature coefficient of gain block 103. Alternatively, other substrate materials may be used depending on the application (e.g., metallic such as copper-tungsten alloy or dielectric such as aluminum nitride ceramic). Size and thickness of substrate 10 may also vary (e.g., 3.5×3.5×67 mm or 4.75×4.75 mm by various lengths). The length of substrate 10 is only one of several design variables and may be adjusted to balance operational specifications for the laser.

For example, a low divergence laser may have its HR/HT mirror (e.g., dichroic mirror 18) and the output coupler (e.g., OC mirror 28) further apart than a wider divergence laser. Substrate 10 may, for example, be 0.5 mm wider than the width of gain block 103, which allows for simplified placement and alignment of components without "overhanging" the substrate. Substrate 10 is shown with a flat surface, but in alternative embodiments it may have a rectangular or triangular profile or other shape, such as discussed further herein.

A film 14, in accordance with one or more embodiments of the present invention, may be disposed substantially between gain block 103 and substrate 10. For example, film 14 may represent a thin, reflective, silver coating vacuum deposited on the surface of substrate 10 under gain block 103. Alternatively, other types of metal (e.g., aluminum, gold, platinum, and/or copper) may be used for film 14 and may include alternating high and low index layers of dielectric materials. Film 14 (e.g., thin film malleable metallic reflector) may be in intimate contact with substrate 10 (e.g., a fine ground substrate) so that film 14 substantially takes on the thermal characteristics of substrate 10, thereby substantially reducing any difference in thermal expansion coefficients between substrate 10 and film 14.

Film 14 preferably has a higher reflectivity (either diffuse or specular) than substrate 10 to reflect light back into gain block 103 (e.g., light at 720 and 840 nm, which is the range of wavelengths over which Nd:YAG excitation is most efficient). Film 14 generally must reflect at least that range of wavelengths that excite the material used for gain block 103. This reflected, or "second pass" absorption permits the use of a lower power lamp (i.e., less electrical energy) for light source 4 to reach the same lasing threshold from monoblock laser 1400. As an example, monoblock laser 1400 with film 14 may reduce the measured lasing threshold by 6-39% relative to conventional monoblock lasers and accordingly reduces the power consumed to operate light source 4 (e.g., a flash lamp).

Gain block 103 for example may be made of YAG crystal doped with Neodymium (Nd:YAG) within a range 0.7-1.1%. Alternatively, other materials (e.g., Nd:YLF or any other solid state laser medium which can be pumped by a flash lamp or diodes) may be suitable, depending upon the desired application, and may be preferred for generating wavelengths other than 1064 nm. The ends of gain block 103 may be polished to eliminate scattering losses and coated to reduce Fresnel reflection losses. Pump light from light source 4 is partially absorbed in and partly transmitted by gain block 103.

HR mirror 16 is deposited on one end of gain block 103 to reflect light back into gain block 103 or alternatively, HR mirror 16 may be deposited onto a cross section of a separate optic of glass, YAG, or other material, as would be understood by one skilled in the art. For example, a typical separate optic integrating a mirror may be approximately 4 mm long to provide adequate surface area for bonding to substrate 10.

Q switch 105 is also supported by substrate 10 and is preferably located between gain block 103 and OPO crystal 26 to attenuate light up to a critical energy level and then quickly switching to a highly transmissive state to cause monoblock laser 1400 to emit a short, high intensity output pulse. As discussed previously, Q switch 105 is also oriented to polarize the light from gain block 103. Dichroic mirror 18 may be vacuum deposited on a cross section of Q switch 105, for example, to efficiently transmit light at 1064 nm and reflect light at 1574 nm.

Light at 1064 nm passing through dichroic mirror 18 enters OPO crystal 26, which may be a non-linear dielectric material oriented for non-critical phase matching. OPO crystal 26 may for example be made of KTP or KTA or other material, which converts light at a first wavelength (e.g., 1064 nm) to light at a second eye-safe wavelength (e.g., 1574 nm). Nonlinear crystals cut at different angles for critical phase matching may also be used to generate other wavelengths. Any optical material which exhibits an intensity-dependent internal polarizability is a candidate for consideration as the wavelength shifting component of the OPO.

Output coupler (OC) mirror 28 is vacuum deposited on a distal end of OPO crystal 26, which passes a portion of the light at 1574 nm as a final output of resonator 6 and reflects light at 1064 nm back into first resonant cavity 20. Second resonant cavity 22 may be formed of dichroic mirror 18, OPO crystal 26, and output coupler mirror 28, in which the remainder of the light at 1574 nm reflects between dichroic mirror 18 and output coupler mirror 28 and through OPO crystal 26. Resonant cavity 22 may be lengthened to minimize divergence of the output light, in which case OC mirror 28 or dichroic mirror 18 may be deposited on a separate optic of YAG or glass, as appropriate for the desired application. For a monolithic OPO crystal 26 (an OPO crystal 26 having dichroic mirror 18 deposited on one end and OC mirror 28 deposited on the other end), the parallelism between ends of crystal 26 is critical to maximizing output gain.

In accordance with one or more embodiments of the present invention, monoblock laser 1400 may be manufactured by cementing gain block 103, Q switch 105, and OPO crystal 26 to substrate 10 using a thin, uniformly-applied liquid, UV-curable bonding agent (e.g., Norland 61 or similar agent). The thin layer of adhesive under gain block 103 must be substantially transparent to light from light source 4. The thin, uniform nature of the adhesive may serve to limit tilt of the components during curing of the adhesive.

In general, an appropriate light source (such as light source 4) is turned on and the output light (e.g., at 1574 nm) is monitored for divergence and/or intensity, as the desired application requires. While monitoring the divergence and/or intensity of the output of resonator 6, HR mirror 16 (e.g., on gain block 103), dichroic mirror 18 (e.g., HR/HT mirror on Q switch 105) and OC mirror 28 (e.g., on OPO crystal 26) are critically aligned to maximize or minimize the desired attribute. Once these components are critically aligned, UV light is directed at the UV-curable bonding agent (e.g., liquid glue layers) in resonator 6 to fix the various components in place.

Figure 15:
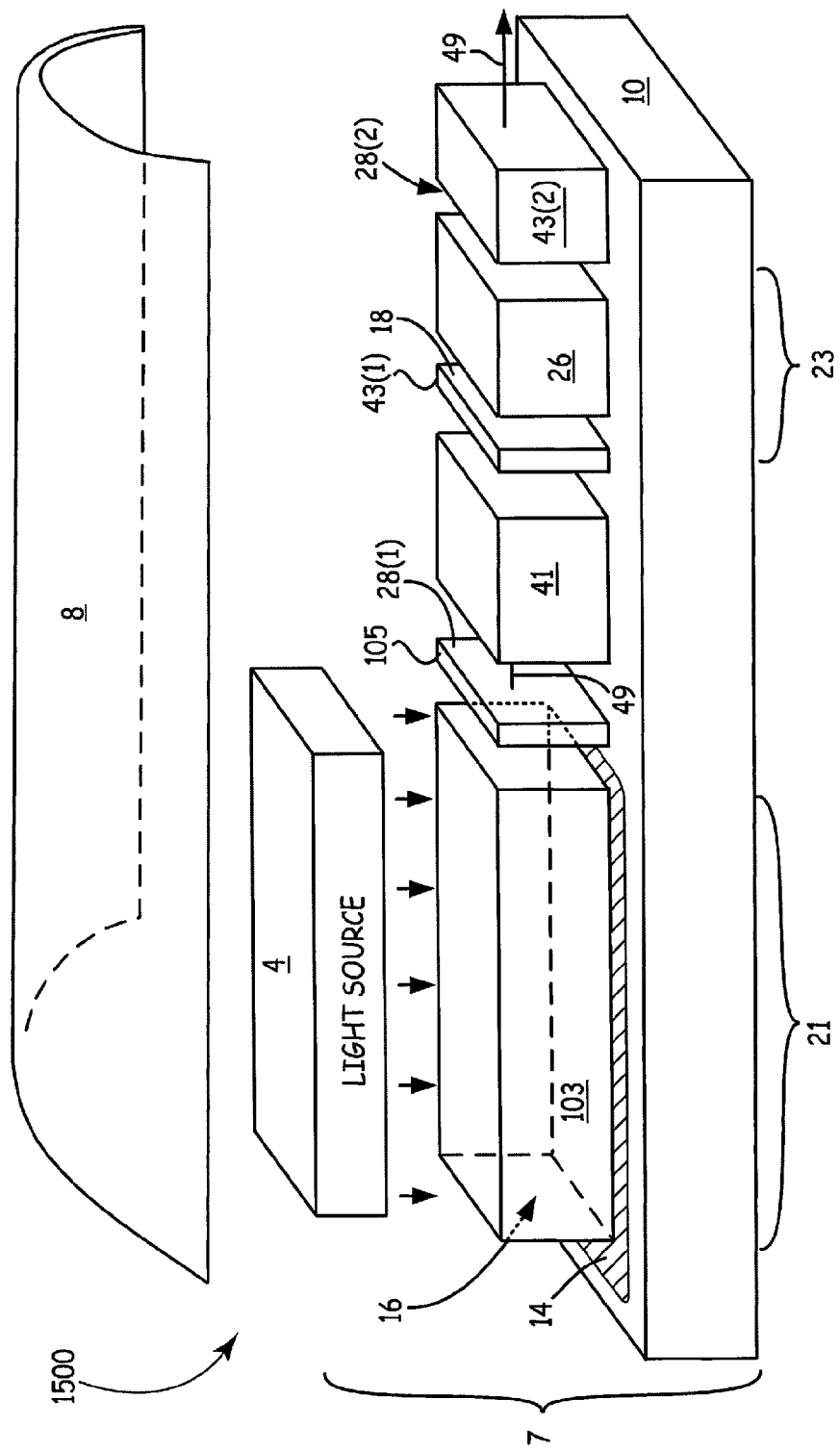
FIG. 15 shows a block diagram illustrating a perspective view of an exemplary monoblock laser having an external OPO configuration in accordance with an embodiment of the present invention.

Monoblock laser 1400 represents an internal OPO design, as second resonant cavity 22 lies within first resonant cavity 20. It should be understood that minor modifications may be made to one or more embodiments of the present invention, such as for example modifying the position of one or more mirrors onto a separate optic, disposing the various mirrors on different components, or using an alternatively shaped substrate, without departing from the spirit and scope of the present invention. For example, FIG. 15 shows an exemplary implementation of a monoblock laser 1500 having an external OPO configuration in accordance with an embodiment of the present invention.

Monoblock laser 1500 includes film 14 located under gain block 103, as discussed similarly in reference to monoblock laser 1400 (FIG. 14), to increase the lasing efficiency of monoblock laser 1500. A first resonant cavity 21 includes HR mirror 16 deposited on an end of gain block 103, Q switch 105, and OC mirror 28(1) deposited on a distal end of Q switch 105. For this exemplary implementation, HR mirror 16 reflects 1064 nm light with high efficiency, while OC mirror 28(1) partially reflects and partially transmits light at the first wavelength of 1064 nm onto optional mode-matching optics 41.

Mode-matching optics 41 may be employed if required for a desired application to ensure that adequate energy and desired divergent beam properties are provided to a second resonant cavity 23. An alternate embodiment for mode-matching optics 41 may be an appropriately oriented and spaced Galilean telescope.

A separate mirror block 43(1) (e.g., fabricated from glass, YAG, or other optically transparent materials as appropriate for a desired application) is provided with dichroic mirror 18 (e.g., HR/HT mirror) deposited on it. Dichroic mirror 18 efficiently passes light at the first wavelength (e.g., 1064 nm) and efficiently reflects light at the second wavelength (e.g., 1574 nm). OPO crystal 26 (or other nonlinear optic) is disposed next along an optical axis 49, followed by another separate mirror block 43(2) with an integrated OC mirror 28(2) disposed on substrate 10. OC mirror 28(2) partially reflects and partially transmits 1574 nm light.

Second resonant cavity 23 is formed by dichroic mirror 18, OPO crystal 26, and OC mirror 28(2). Light from optional matching optics 41 enters OPO crystal 26, which converts light at the first wavelength of 1064 nm to light at the second wavelength of 1574 nm. OC mirror 28(2) substantially passes a portion of the light at the second wavelength (1574 nm) as an output of monoblock laser 1500, while reflecting the remainder back into OPO crystal 26. Film 14, for example, may be implemented within any monoblock laser configurations discussed herein and further details regarding monoblock laser implementations along with film 14 may be found in U.S. patent application Ser. No. 11/340,305.

Figure 16A:
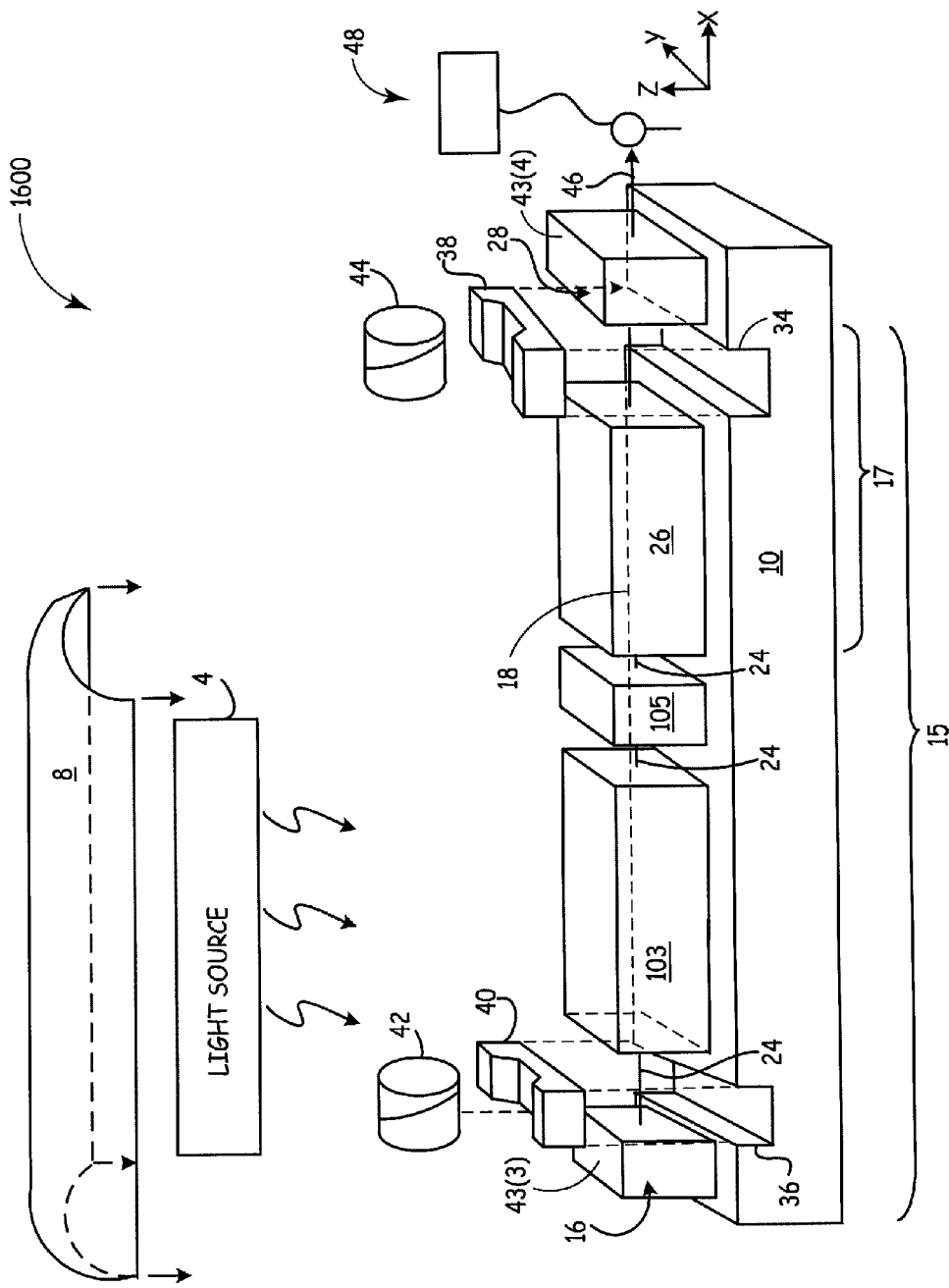
FIG. 16a shows an exploded, perspective view of an exemplary monoblock laser with Risley wedge pairs in V-blocks for an internal OPO configuration in accordance with an embodiment of the present invention.

In accordance with one or more embodiments of the present invention, various optical elements (including Q switch 105) may be configured to be adjustable prior to being fixed on substrate 10. For example, FIG. 16a shows a monoblock laser 1600 that illustrates certain techniques for adjusting and positioning various elements on substrate 10 in accordance with an embodiment of the present invention. Monoblock laser 1600 includes various components previously discussed herein (e.g., in reference to monoblock lasers 100, 1400, and 1500) and the general description will not be repeated.

Monoblock laser 1600 includes HR mirror 16, which may be deposited on a separate mirror block 43(3) to reflect light back along a primary axis 24 into gain block 103. For example, mirror block 43(3) may be approximately 4 mm long to provide adequate surface area for bonding to substrate 10. Q switch 105 is located between gain block 103 and OPO crystal 26 on substrate 10, with dichroic mirror 18 vacuum deposited on OPO crystal 26 (or Q switch 105). OC mirror 28 is vacuum deposited on a separate mirror block 43(4) and passes a portion of the light at 1574 nm as a final output of monoblock laser 1600 and reflects light at 1064 nm back into a first resonant cavity 15. A second resonant cavity 17 is formed of dichroic mirror 18, OPO crystal 26, and OC mirror 28, in which the remainder of the light at 1574 nm reflects between dichroic mirror 18 and OC mirror 28 and through OPO crystal 26.

In accordance with one or more embodiments of the present invention, a pair of rectangular trenches 34 and 36 may be machined into substrate 10 and a pair of corresponding V-blocks 38 and 40 may be machined of the same material as substrate 10 to fit into trenches 34 and 36, respectively, and for example affixed with an adhesive. Risley wedge pairs 42 and 44 each comprises two optical wedges having equal wedge angles which are twisted against each other to adjust the direction of light passing through the pair. Risley wedge pairs 42 and 44 may be positioned, for example, adjacent to mirror blocks 43(3) and 43(4), respectively, and held by corresponding V-blocks 38 and 40.

Figures 16B, 16C:
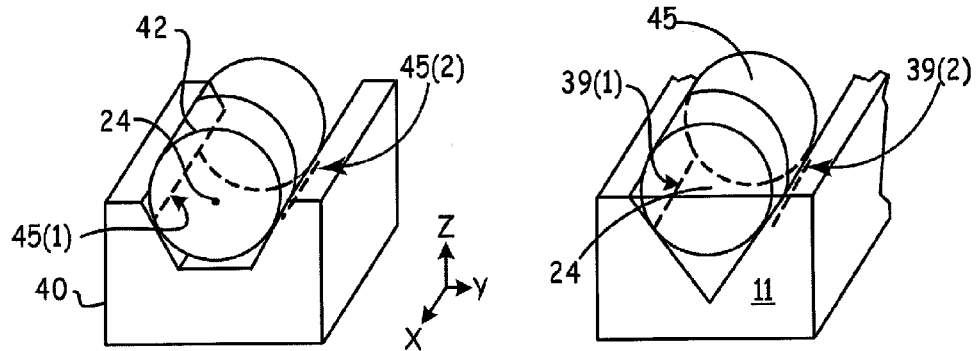
FIGS. 16b and 16c show perspective views of exemplary implementations for the Risley wedge pairs for the monoblock laser of FIG. 16a in accordance with one or more embodiments of the present invention.

For example in accordance with an embodiment of the present invention, FIG. 16b illustrates an exemplary implementation with V-block 40 contacting Risley wedge pair 42 along two lines of contact 45(1) and 45(2). Consequently for one embodiment, the bottom of Risley wedge pair 42 does not rest on V-block 40. The support of V-block 40 along contact lines 45(1) and 45(2) fixes the rotational axis of Risley wedge pair 42 substantially parallel to primary axis 24, permitting Risley wedge pair 42 to be adjusted exclusively in rotation (and not in pitch nor yaw) while the laser output is monitored, and an optimal rotational position of Risley wedge pair 42 fixed when the laser output parameter (e.g., divergence and/or intensity) reaches a desired threshold. For reference for this exemplary implementation, pitch is angular movement with respect to the x axis in the x-z plane, while yaw is angular movement with respect to the x axis in the x-y plane in reference to the orthogonal axes shown in FIGS. 16a and 16b.

Consequently this technique, in accordance with one or more embodiments of the present invention, provides a bondable optic that does not require tipping for alignment and thus avoids the conventional tipping approach that leads to a tapered glue joint (e.g., resulting in misalignment due to volumetric glue shrinkage). Thus, these techniques may be implemented within any monoblock laser which supports a Risley wedge pair so that only rotational movement with respect to the optical axis is required. Furthermore, a support with a different geometry on its inner sides (e.g., irregular, curved, or jagged) may be used that does not form two continuous straight lines of support between itself and the Risley wedge pair as long as the sides of the support maintains alignment of the Risley wedge pair.

As an implementation example, the glue may be placed in the space between the Risley wedge pair (e.g., Risley wedge pair 42) and the V-block (e.g., V-block 40) and cured. The tendency of the glue to shrink is resisted by the physical lines of contact (e.g., lines 45(1) and 45(2)) between the Risley wedges and the V-block. This creates strong tensile forces within the cured glue which serve to hold the Risley wedges firmly in the V-blocks. Thus, it is the V-block/Risley geometry that determines the position of the Risley wedge pair rather than the glue, while the glue serves only to affix the Risley wedge pair to the V-block.

Although Risley wedge pairs 42 and 44 are implemented within monoblock laser 1600, it should be understood that any number of Risley wedge pairs may be employed. For example, general rule may be that for "n" mirrors, "n−1" Risley wedge pairs may be employed to align the laser.

Additionally, it should also be understood that substrate (e.g., substrate 10) may be machined so as to provide the necessary contact support between the Risley wedge pair and the substrate, rather than the V-block. For example in accordance with an embodiment of the present invention, FIG. 16c shows a substrate 11 which is formed with an integral V-groove to support a Risley wedge pair 45, with contact lines 39(1) and 39(2) forming the two lines of support (e.g., substrate 10 may be shaped as shown for exemplary substrate 11).

As an example, the rest of substrate 11 is otherwise flat to conform to rectangular optical components or alternatively otherwise shaped to properly support the other optical components (e.g., as explained further herein, the optical components may have a common cross sectional shape). In accordance with an embodiment of the present invention, the V-block or shaped substrate for Risley wedge pairs 42 and 44 (discussed in reference to FIGS. 16a-16c) may also be applied to other optical components, such as Q switch 105. For example as discussed further herein, Q switch 105 may be shaped similar to Risley wedge pair 42 and fit within a corresponding V-block 40 so that Q switch 105 may be properly aligned prior to fixing its position to substrate 10.

Figure 17:
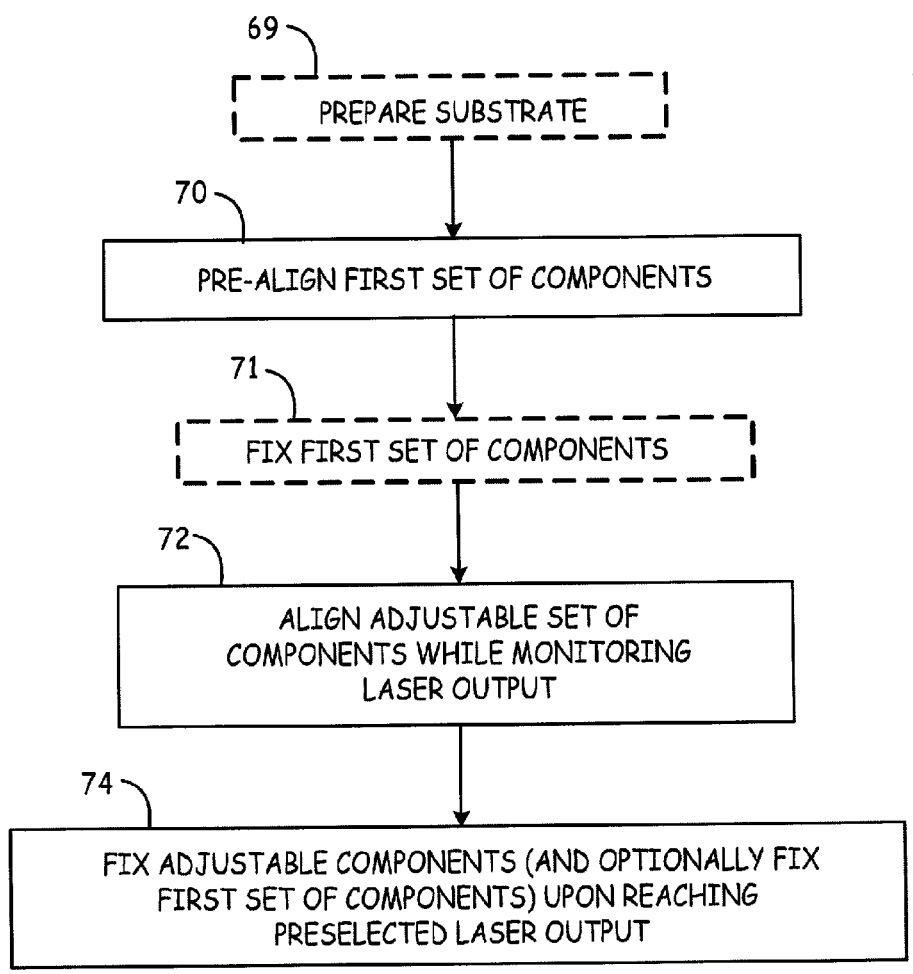
FIG. 17 shows a flowchart for a method of assembly for a monoblock laser in accordance with one or more embodiments of the present invention.

In accordance with one or more embodiments of the present invention, FIG. 17 illustrates exemplary operations for assembling a monoblock laser (e.g., monoblock laser 1600). The substrate may optionally be prepared (block 69), which for the embodiment shown in FIG. 16a may include gluing non-integral V-blocks (e.g., V-blocks 38 and 40) into the substrate (e.g., substrate 10). A pre-alignment operation is performed (block 70), where mirror block 43(3) (with HR mirror 16), gain block 103, Q switch 105, OPO crystal 26 (with dichroic mirror 18), and mirror block 43(4) (with OC mirror 28) are fixed in place on substrate 10 along optical axis 24 using a thin, uniform layer of a UV-sensitive adhesive (e.g., Norland 61). For example, a single drop of Norland 61 may be adequate for adhesion and UV light may preferably be employed at this time to fix the position of the aforementioned components (optional block 71).

The thin, uniform nature of the adhesive serves to limit tilt of the components during curing of the adhesive as adhesives shrink volumetrically during curing. Other adhesive techniques, including adhesives sensitive to heat or which cure on exposure to air, or diffusion bonding may also be used. Depending on the technique used, manufacturer's instructions may include temperature cycling to cure and stabilize the adhesive, as required. For block 72, light source 4 may be energized and a lased light output 46 monitored in electronics/optics block 48 (e.g., sensor and electronic system or energy monitor system as known in the art) for some desired physical parameter (e.g., divergence and/or light intensity) as desired for the application.

While monoblock laser 1600 operates, circular Risley wedge pairs 42 and 44 are adjusted to optimize the desired physical parameter being measured. Optionally, Q switch 105 may also be adjusted (e.g., rotated) to optimize performance, as discussed further herein. In block 74, once the energy monitoring system in electronics/optics block 48 registers a pre-set threshold or desired value for the divergence and/or light intensity or other measured parameters, the adjustable Risley wedge pairs 42,44 may be fixed in place (including all other components if not already fixed in place) by shining UV light on the adhesive.

Monoblock laser 1600 is an internal OPO design, as second resonant cavity 17 is contained within first resonant cavity 15. However, it should be understood by those skilled in the art that one or more of the techniques disclosed herein may apply equally well to a simple one-stage laser (e.g., one without dichroic mirror 18 and OPO 26, with or without Q switch 105). Accordingly, various modifications may be implemented, such as for example modifying the position of one or more mirrors onto a separate optic, disposing dichroic mirror 18 on an end of Q switch 105, and/or using an alternatively shaped substrate (such as a rectangular or V-shaped substrate), without departing from the spirit and scope of the present invention. Furthermore, various embodiments of the present invention may be combined, as desired to meet the requirements for a desired application. For example, film 14 (discussed in reference to FIGS. 14 and 15) may be implemented within monoblock laser 1600 (FIG. 16) or within other monoblock laser implementations discussed herein (e.g., monoblock laser 101 or for example for a monoblock laser discussed in reference to FIG. 18b, 19c, or 19d).

Figure 18A:
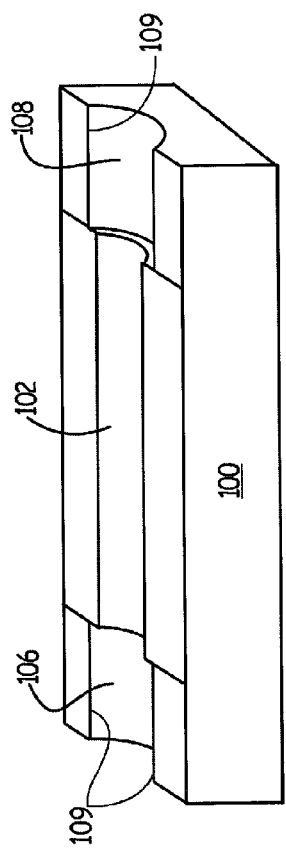
FIGS. 18a and 18b show perspective views of an exemplary substrate and an exemplary monoblock laser, respectively, with the Risley wedge pairs in accordance with one or more embodiments of the present invention.
Figure 18B:
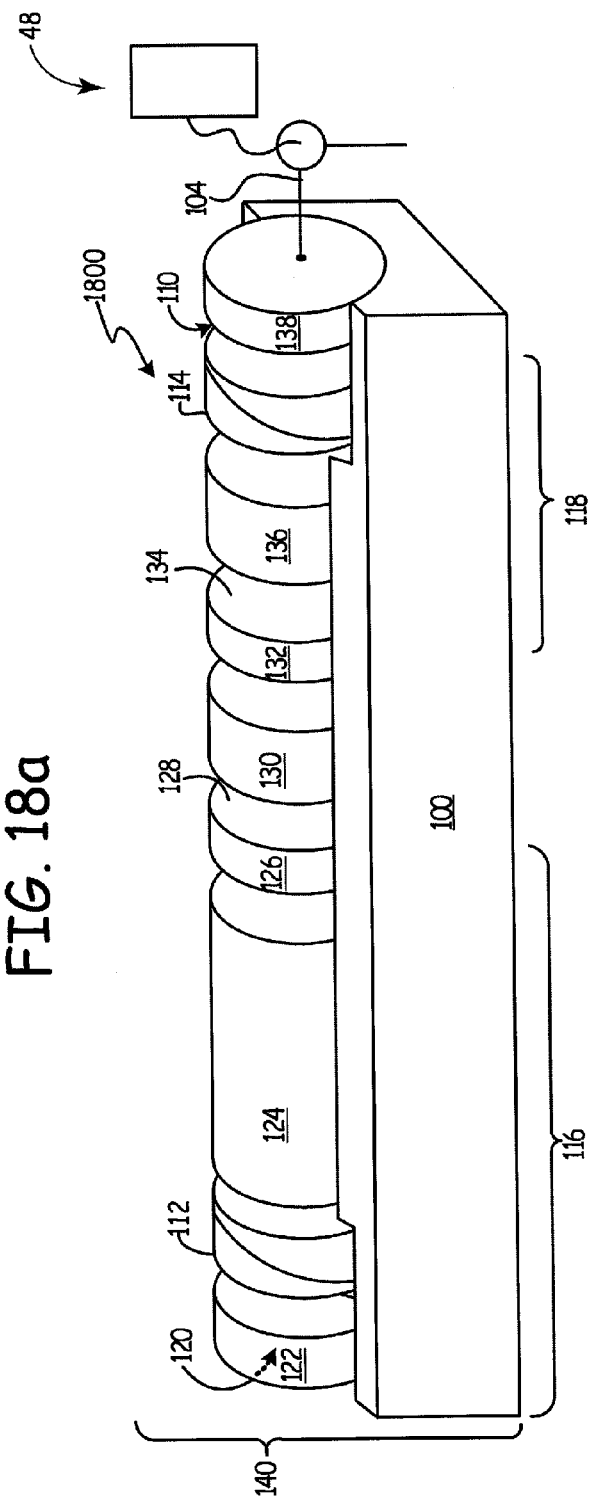

FIGS. 18a and 18b show an external OPO configuration for a monoblock laser 1800 having a concave substrate with integral detents for two Risley wedge pairs in accordance with an embodiment of the present invention. Monoblock laser 1800 includes a substrate 100 (e.g., fabricated of a YAG medium and similar to substrate 10) having a central core 102 for supporting a number of optical elements along an optical axis 104. Detents 106 and 108 on respective ends of substrate 100 may each have a larger radius than central core 102. Detent 106 supports HR mirror 120 and an adjustable Risley wedge pair 112, while detent 108 supports output coupler mirror 110 and an adjustable Risley wedge pair 114.

In accordance with an embodiment of the present invention, substrate 100 provides inner edges 109 of detents 106 and 108 to fix where Risley wedge pairs 112 and 114 are located. The radii of detents 106 and 108 may be slightly less than the radii of Risley wedge pairs 112 and 114. Therefore, edges 109 may fully support each Risley wedge pair so that the Risley wedge pairs 112 and 114 do not rest on the bottom of the curved sections of substrate 100.

A first resonant cavity 116 includes HR mirror 120 deposited on an end of a separate optic 122, Risley wedge pair 112, a gain block 124, and a Q switch 126 with an intermediate mirror 128 deposited thereon. Gain block 124 may be similar to gain block 103, but shaped as shown in FIG. 18b. Similarly, Q switch 126 may be similar to and function as described for Q switch 105 (i.e., to function as a switch and also to polarize light at a first wavelength), but shaped as shown in FIG. 18b. Furthermore, substrate 100 may include an additional detent to support Q switch 126 and allow rotation and alignment, as discussed similarly for detents 106 and 108 and Risley wedge pairs 112 and 114. In general, various components discussed in reference to FIG. 18b are similar to corresponding components discussed previously (e.g., in reference to FIGS. 1 and 14-16a), but are shaped appropriately for substrate 100.

Intermediate mirror 128 partially passes light at the first wavelength onto optional mode-matching optics 130 and reflects the rest of that light. Mode-matching optics 130 may be employed if desired, depending upon the application for example, to ensure that adequate energy and the desired divergent beam properties are provided to a second resonant cavity 118. An alternate embodiment for optics 130 may be an appropriately oriented and spaced Galilean telescope.

A separate mirror block 132 is disposed next in the optical path of laser resonator 140, with a dichroic mirror 134 (e.g., HR/HT mirror) deposited on mirror block 132. Dichroic mirror 134 passes light at a first wavelength (e.g., 1064 nm) and reflects light at a second wavelength (e.g., 1574 nm) back into second resonant cavity 118. A nonlinear crystal 136 (e.g., OPO crystal) follows next along the optical axis 104, and another separate mirror optic 138 with an integrated OC mirror 110 on its cross section is disposed on the end of substrate 100. Second resonant cavity 118 is formed by dichroic mirror 134, nonlinear optic 136, Risley wedge pair 114, and OC mirror 110.

Light from first resonant cavity 116 enters nonlinear crystal 136, which converts light at the first wavelength to light at the second wavelength. OC mirror 110 substantially passes a portion of the light at the second wavelength as an output of monoblock laser 1800 (e.g., shown generally in FIG. 18b without a light source and a reflector) and reflects the remainder of the light back into nonlinear crystal 136 (e.g., dielectric).

In general, the various elements of monoblock laser 1800 may be similar to the corresponding elements discussed previously for various embodiments (e.g., with respect to preferred materials and their alternatives for this external OPO embodiment). Furthermore, monoblock laser 1800 having the concave substrate may be manufactured as similarly described in reference to FIG. 17.

Figure 19B:
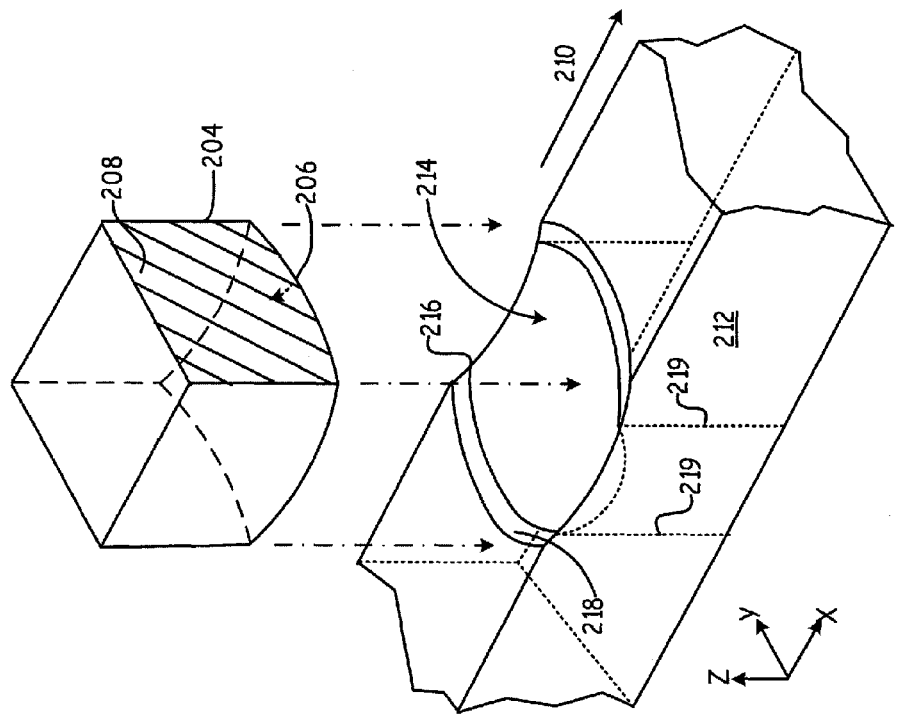
FIGS. 19a and 19b show perspective views of exemplary substrates and spherical bottom optical elements in accordance with one or more embodiments of the present invention.
Figure 19A:
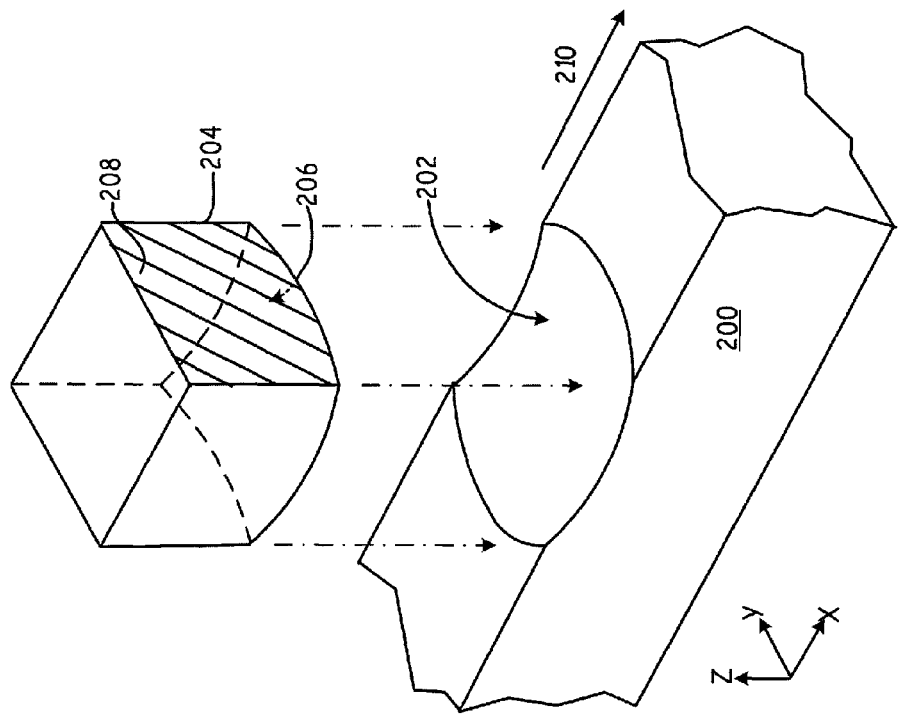

FIGS. 19a-19d illustrate substantially matching radii for an optic and substrate, in accordance with embodiments of the present invention, which may eliminate undesirable tipping and misalignment during manufacture. For example, FIG. 19a shows a cutaway portion of a substrate 200 with a spherical dimple or recess 202 machined on its otherwise flat surface. A separate optic 204 has all sides flat, for example, except for its bottom 206, which is spherically shaped with substantially the same radius as spherical dimple 202. Any cross section taken across bottom 206 through its center will have the same radius of curvature. Machine tools equipped with specially shaped, diamond-grit-embedded cutters, for example, may be used to create dimple 202 and bottom 206. As an example, an optimal radius of curvature for elements with a 3 mm square cross section may be approximately 10 mm, but a larger radius of curvature, such as 12 mm, works for elements with a square cross section of 4.25 mm. Optic 204 may have a mirror 208 on one of its cross sections perpendicular to an optical axis 210.

FIG. 19b shows a portion of an alternative substrate 212 for use with a spherical bottom optic 204. For example, a spherically shaped recess is machined in substrate 212, and then the same spherical shaped recess as in FIG. 19a is machined until contour 216 and narrow rim 218 is formed as illustrated in FIG. 19b. Narrow rim 218 (formed between the surface of substrate 212 and contour 216) supports optic 204. Additionally, another spherically shaped recess 214 having a smaller radius than the one which forms rim 218 may be machined into substrate 212, which permits excess glue to accumulate therein during alignment. Alternatively, small recess 214 extends down through substrate 212 to form a hole through the substrate.

During manufacture, a first set of optics (i.e., those without a spherical bottom) are preferably glued to the substrate. A thin, uniform layer of an adhesive is applied to surfaces 202 and/or 206 and optic 204 is placed into dimple 202 (or alternatively onto rim 218). If not already glued, the other elements forming the resonator may be glued onto the substrate (block 71 of FIG. 17). The laser is energized and the divergence and/or intensity of the light output by the laser are monitored while optic 204 is moved in pitch and/or yaw (block 72). At a pre-set threshold or desired value representing a desired divergence, intensity, and/or other parameter, optimal alignment of optic 204 is achieved and appropriate techniques are used to fix optic 204 in place, such as an UV sensitive adhesive (block 74).

In general, the matching spherical radii (e.g., on a substrate and a separate optic with a mirror) permit alignment without creating a tapered adhesive joint. Thus, the interface between the optical element and the substrate is optimally shaped so the glue layer maintains a constant thickness as the optic is tipped in pitch and/or yaw.

The substantially matching radii may be applicable, without limitation, to all monoblock lasers and to any number and type of optical elements in accordance with one or more embodiments of the present invention. For example, an embodiment of the present invention includes a spherical dimple in an optic and a substrate with a matching spherical protrusion.

As another example in accordance with one or more embodiments of the present invention, optic 204 may represent Q switch 105 or alternatively Q switch 105 may be shaped and positioned appropriately within one of V-blocks (e.g., as described in reference to FIGS. 16a-16c) to allow Q switch 105 to be rotated and adjusted prior to fixing to a desired position (blocks 72 and 74 of FIG. 17). For example, the wavelength conversion efficiency of the OPO crystal may be optimized by rotating the Q switch (e.g., Q switch 105 or Q switch 126) around the [110] axis and optionally tilting it as well. The [110] axis generally must be aligned precisely parallel to the y-axis of the OPO crystal for best conversion (e.g., rotate and/or tilt the Q switch to precisely align and remove crystal orientation uncertainty).

FIG. 19c shows a side view of a monoblock laser 1900 with a pair of substantially matching radii optics and substrate dimples in accordance with an embodiment of the present invention. A substrate 220 has dimples 222 and 224 machined therein. An HR mirror 226 is disposed on a separate optic 228 (e.g., mirror block or optic block), which has a spherical bottom 230 of substantially the same radius of curvature as dimple 222. Gain block 103 and Q switch 105 are disposed as shown, with a HR/HT mirror 236 disposed on Q switch 105 and perpendicular to an axis 232. HR/HT mirror 236 passes light at a first wavelength (e.g., 1064 nm) and reflects light at a second wavelength (e.g., 1574 nm). An OPO 238 is disposed next along axis 232, while an OC mirror 240 is deposited on a side of separate optic 242 (e.g., mirror block or optic block).

Optic 242 has a spherical bottom 243 matched in radius to that of the substrate dimple 224. OC mirror 240 passes a portion of light at the second wavelength as a laser output 250, while reflecting light at the first wavelength. A first resonant cavity 244 is formed by HR mirror 226, gain block 103, Q switch 105, OPO 238, and OC 240. A second resonant cavity 246 is formed by HR/HT mirror 236, OPO 238, and OC 240 to form an internal OPO configuration.

FIG. 19d illustrates a monoblock laser 1950 in accordance with an embodiment of the present invention. Monoblock laser 1950 includes corresponding optical components with functions similar to that of monoblock laser 1900 (FIG. 19c), but monoblock laser 1950 provides a Q switch 334 that is adjustable. Specifically, Q switch 334 is similar to Q switch 105, but has a spherical bottom 230 with substantially the same radius of curvature as dimple 222. Consequently, Q switch 334 may be aligned for optimal performance or to otherwise adjust parameters of laser output 250 as described above and in a similar fashion for blocks 72 and 74 (FIG. 17).

In general, operation of monoblock lasers 1900 and 1950 may be as described generally above, for example, in reference to FIG. 16a, while manufacture may be as described generally above, for example, in reference to FIG. 17. Further details regarding monoblock laser implementations may be found in U.S. patent application Ser. No. 11/371,457.

Systems and methods are disclosed herein to provide monoblock lasers that may provide improved performance and/or improved manufacturability. For example, in accordance with an embodiment of the present invention, a monoblock laser is provided that includes a Q switch that is oriented and implemented to also provide a polarizing function, which allows the Brewster interface to be eliminated from the gain medium. Consequently, a monoblock laser resonator may be manufactured with certain cost reduction improvements relative to conventional monoblock lasers. The monoblock laser may further include, for example, a film between the gain medium and the common substrate, which may provide improved performance and/or reduced power requirements. The monoblock laser may further include various techniques for adjusting/aligning one or more of the optical components and may further include one or more Risley wedge pairs.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A monoblock laser comprising:
a substrate;
a reflective mirror, disposed on the substrate, adapted to reflect light of a first wavelength;
a gain block, disposed on the substrate, adapted to generate the light at the first wavelength and receive the light reflected from the reflective mirror;
a Q switch, disposed on the substrate, adapted to receive and polarize the light from the gain block and provide pulsed light that is polarized and at the first wavelength;
a dichroic mirror, disposed on the substrate, adapted to pass the pulsed light from the Q switch and reflect light at a second wavelength;
an optical parametric oscillator crystal, disposed on the substrate, adapted to receive the pulsed light from the dichroic mirror and convert at least a portion of the pulsed light at the first wavelength into light at the second wavelength;
an output coupler mirror, disposed on the substrate, adapted to reflect light at the first wavelength and pass at least a portion of the light at the second wavelength to provide a laser output signal; and
a first optic block having at least a partially curved bottom surface, wherein the first optic block is disposed on the substrate at a corresponding curved surface to allow alignment of the first optic block in a pitch direction and a yaw direction along an optical axis, and wherein the reflective mirror, the Q switch, the dichroic mirror, or the output coupler mirror is disposed on a first surface of the first optic block.

2. The monoblock laser of claim 1, further comprising a film disposed parallel to the optical axis of the monoblock laser and at least substantially between the substrate and the gain block to reflect optical pumping light into the gain block, wherein the film has a thermal expansion coefficient substantially equivalent to a thermal expansion coefficient of the substrate and the gain block.

3. The monoblock laser of claim 2, further comprising means for allowing alignment of the Q switch relative to the optical axis to position the Q switch in a pitch direction and a yaw direction, and wherein the film comprises alternating high and low index layers of dielectric materials.

4. The monoblock laser of claim 1, further comprising:
a first Risley wedge pair disposed on the substrate and between the reflective mirror and the gain block; and
a second Risley wedge pair disposed on the substrate and between the optical parametric oscillator crystal and the output coupler mirror.

5. The monoblock laser of claim 4, further comprising:
a first and a second V-block disposed between the respective first and second Risley wedge pairs and the substrate;
wherein the first and second V-block each supports the corresponding first and second Risley wedge pairs along two contact lines; and
wherein the substrate comprises a first trench and a second trench, with the first and second V-blocks disposed partially within the first and second trenches and made of a same material as the substrate.

6. The monoblock laser of claim 4, wherein the first and second Risley wedge pairs are each supported by the substrate along two contact lines.

7. The monoblock laser of claim 1, further comprising:
a second optic block having at least a partially curved bottom surface, wherein the second optic block is disposed on the substrate at a corresponding curved surface to allow alignment of the second optic block in a pitch direction and a yaw direction along the optical axis, and wherein the output coupler mirror is disposed on a first surface of the second optic block, with the reflective mirror, the Q switch, or the dichroic mirror disposed on the first surface of the first optic block.

8. The monoblock laser of claim 1, wherein the curved surface of the substrate comprises a recess and a narrow rim disposed between the recess and a surface of the substrate, with the first optic block supported entirely by the narrow rim.

9. The monoblock laser of claim 1, further comprising:
a film disposed at least substantially between the substrate and the gain block and along the gain block parallel to the optical axis to reflect optical pumping light into the gain block at an angle substantially perpendicular to the optical axis, the film having a thermal expansion coefficient substantially equivalent to a thermal expansion coefficient of the substrate and the gain block;
wherein the film comprises a silver coating deposited on the substrate, the gain block comprises an Nd:YAG medium, the Q switch comprises a Cr4+:YAG crystal, the optical parametric oscillator crystal comprises a KTP crystal, and the substrate comprises an undoped YAG medium;
wherein the reflective mirror and the output coupler mirror form a first resonant cavity, and the dichroic mirror and the output coupler mirror form a second resonant cavity within the first resonant cavity; and
wherein the Q switch polarizes the light based on a cut and an orientation of the Q switch such that a [110] crystal axis of the Q switch is parallel to an optical axis of the monoblock laser to polarize the light.

10. The monoblock laser of claim 1, further comprising:
a light source adapted to provide light at a third wavelength to the gain block for the gain block to use to generate the light at the first wavelength;
a reflector disposed near the light source to reflect the light from the light source to the gain block; and wherein the monoblock laser forms part of a system comprising at least one of a rangefinder system and a targeting system.

11. A monoblock laser comprising:
a common substrate;
a first reflective means, coupled to the common substrate, for reflecting light at a first wavelength;
means for generating light at the first wavelength, wherein the first reflective means reflects the light at the first wavelength towards the generating means, and wherein the generating means is coupled to the common substrate;
a switching means, coupled to the common substrate, for receiving and polarizing the light from the generating means and providing pulsed light that is polarized and at the first wavelength, wherein the switching means polarizes the light based on its cut and orientation within the monoblock laser such that a crystal axis of the switching means is parallel to an optical axis of the monoblock laser to polarize the light;
a first mirror means, coupled to the common substrate, for passing the pulsed light from the switching means and for reflecting light at a second wavelength;
means for converting the pulsed light at the first wavelength into light at the second wavelength, wherein the converting means is coupled to the common substrate;
a first coupling means, coupled to the common substrate, for reflecting light at the first wavelength and for passing at least a portion of the light at the second wavelength to provide an output signal for the monoblock laser; and
a first optic block having at least a partially curved bottom surface, wherein the first optic block is disposed and supported by the common substrate at a corresponding rim located between a surface of and a recess of the common substrate to allow alignment of the first optic block in a pitch direction and a yaw direction along an optical axis, and wherein the first reflective means, the switching means, the first mirror means, or the first coupling means is disposed on a first surface of the first optic block.

12. The monoblock laser of claim 11, further comprising a thin film disposed on the common substrate and between the generating means and the common substrate, wherein the thin film has a thermal expansion coefficient substantially equivalent to a thermal expansion coefficient of the common substrate.

13. The monoblock laser of claim 11, further comprising:
at least one Risley wedge pair coupled to the common substrate; and
means for supporting and allowing rotation of the at least one Risley wedge pair around an optical axis,
wherein the common substrate comprises at least a first trench disposed transverse to an optical axis, with the supporting means disposed partially within the at least first trench and made of a same material as the common substrate.

14. The monoblock laser of claim 11, further comprising means for allowing rotation of at least one of the first reflective means and the first coupling means, wherein the first mirror means is disposed on the first surface of the first optic block.

15. The monoblock laser of claim 11, further comprising a second coupling means, coupled to the common substrate and disposed between the generating means and the first mirror means, for partially reflecting and partially transmitting the light at the first wavelength from the generating means.

16. The monoblock laser of claim 11, wherein the monoblock laser forms part of a system comprising a rangefinder system or a targeting system.

17. A method of providing light from a monoblock laser, the method comprising:
generating pump light;
generating light at a first wavelength based on the pump light;
polarizing the light with a Q switch to provide polarized light at the first wavelength, wherein the Q switch polarizes the light based on a cut and an orientation of the Q switch, with a surface of the Q switch receiving the light at an approximately normal incident angle;
passing light at the first wavelength and reflecting light at a second wavelength;
converting the light at the first wavelength into light at the second wavelength;
transmitting at least a portion of the light at the second wavelength as an output signal of the monoblock laser and reflecting light at the first wavelength back into the monoblock laser, wherein the monoblock laser is configured in an internal optical parametric oscillator configuration; and
rotating an optical element of the monoblock laser in a pitch and a yaw direction to optimize the output signal prior to fixing a position of the optical element, wherein the optical element is supported entirely by a circular rim disposed below a surface of a common substrate of the monoblock laser.

18. The method of claim 17, further comprising reflecting with a thin film the pump light back for the generating of the light at the first wavelength, wherein the thin film is disposed along an optical axis of the monoblock laser to reflect the pump light substantially perpendicular to the optical axis, the thin film having a thermal expansion coefficient substantially equivalent to a thermal expansion coefficient of a gain block and a common substrate of the monoblock laser.

19. The method of claim 17, further comprising rotating the Q switch around an optical axis to optimize performance prior to fixing a position of the Q switch, wherein the Q switch is supported by a V-block disposed partially within a transverse trench of a common substrate of the monoblock laser.

20. The method of claim 17, further comprising rotating a second optical element of the monoblock laser in a pitch and a yaw direction to optimize the output signal prior to fixing a position of the second optical element, wherein the second optical element is supported entirely by a circular rim disposed below a surface of a common substrate of the monoblock laser.

21. The monoblock laser of claim 1, wherein a surface of the Q-switch receives the light at an approximately normal incident angle.

22. The monoblock laser of claim 11, wherein a surface of the Q-switch receives the light at an approximately normal incident angle.

23. The method of claim 17, wherein a crystal axis of the Q switch is parallel to an optical axis of the monoblock laser to polarize the light.

24. The monoblock laser of claim 11, further comprising a film disposed at least partially between the common substrate and the generating means and disposed at least partially along the generating means, parallel to the optical axis of the monoblock laser, to reflect optical pumping light substantially perpendicular to the optical axis and into the generating means, wherein the film has a thermal expansion coefficient substantially equivalent to a thermal expansion coefficient of the common substrate and is comprised of alternating high and low index layers of dielectric materials.

25. The monoblock laser of claim 11, wherein the first reflective means and the first coupling means form a first resonant cavity, and the first mirror means and the first coupling means form a second resonant cavity within the first resonant cavity.

26. A monoblock laser comprising:
a substrate;
a reflective mirror, disposed on the substrate, adapted to reflect light of a first wavelength;
a gain block, disposed on the substrate, adapted to generate the light at the first wavelength and receive the light reflected from the reflective mirror;
a film disposed at least substantially between the substrate and the gain block and disposed at least partially along the gain block, parallel to an optical axis of the monoblock laser, to reflect optical pumping light substantially perpendicular to the optical axis and into the gain block;
a Q switch, disposed on the substrate, adapted to receive the light from the gain block and provide pulsed light at the first wavelength;
a dichroic mirror, disposed on the substrate, adapted to pass the pulsed light from the Q switch and reflect light at a second wavelength;
an optical parametric oscillator crystal, disposed on the substrate, adapted to receive the pulsed light from the dichroic mirror and convert at least a portion of the pulsed light at the first wavelength into light at the second wavelength;
an output coupler mirror, disposed on the substrate, adapted to reflect light at the first wavelength and pass at least a portion of the light at the second wavelength to provide a laser output signal; and
a first optic block having at least a partially curved bottom surface, wherein the first optic block is disposed on the substrate along a rim disposed below a surface of the substrate to allow alignment of the first optic block in a pitch and a yaw direction relative to the optical axis, and wherein the reflective mirror, the Q switch, the dichroic mirror, or the output coupler mirror is disposed on a first surface of the first optic block.

27. The monoblock laser of claim 26, wherein the Q switch is adapted to polarize the light at the first wavelength based on a cut and an orientation of the Q switch such that a [110] crystal axis of the Q switch is parallel to an optical axis of the monoblock laser to polarize the light.

28. The monoblock laser of claim 27, wherein the reflective mirror and the output coupler mirror form a first resonant cavity, and the dichroic mirror and the output coupler mirror form a second resonant cavity within the first resonant cavity.

29. The monoblock laser of claim 27, wherein the film comprises a silver coating deposited on the substrate, the gain block comprises an Nd:YAG medium, the Q switch comprises a Cr4+:YAG crystal, the optical parametric oscillator crystal comprises a KTP crystal, and the substrate comprises an undoped YAG medium, and wherein the film has a thermal expansion coefficient substantially equivalent to a thermal expansion coefficient of the substrate and the gain block.

30. The monoblock laser of claim 26, further comprising:
a first Risley wedge pair disposed on the substrate and between the reflective mirror and the gain block; and
a second Risley wedge pair disposed on the substrate and between the optical parametric oscillator crystal and the output coupler mirror.

31. The monoblock laser of claim 30, further comprising:
a first and a second V-block disposed between the respective first and second Risley wedge pairs and the substrate;
wherein the first and second V-block each supports the corresponding first and second Risley wedge pairs along two contact lines; and
wherein the substrate comprises a first trench and a second trench, the first and second trenches transverse to the optical axis, with the first and second V-blocks disposed partially within the first and second trenches and made of a same material as the substrate.

32. The monoblock laser of claim 30, wherein the first and second Risley wedge pairs are each supported by the substrate along two contact lines.

33. The monoblock laser of claim 26, further comprising:
a second optic block having at least a partially curved bottom surface, wherein the second optic block is disposed on the substrate at a corresponding curved surface to allow alignment of the second optic block in a pitch direction and a yaw direction along the optical axis, and wherein the output coupler mirror is disposed on a first surface of the second optic block, and with the reflective mirror, the Q switch, or the dichroic mirror disposed on the first surface of the first optic block.

34. The monoblock laser of claim 26, wherein the Q switch has at least a partially curved bottom surface corresponding to a curved surface on the substrate to allow alignment of the Q switch along an optical axis of the monoblock laser.

35. The monoblock laser of claim 26, further comprising:
a light source adapted to provide the optical pumping light to the gain block, wherein the optical pumping light is at a third wavelength for the gain block to use to generate the light at the first wavelength, wherein the film is adapted to receive the optical pumping light that has passed through the gain block from the light source and reflect the optical pumping light back to the gain block; and
a reflector disposed near the light source to reflect the light from the light source to the gain block.

* * * * *